(12) United States Patent
Martinson et al.

(10) Patent No.: US 9,542,626 B2
(45) Date of Patent: Jan. 10, 2017

(54) AUGMENTING LAYER-BASED OBJECT DETECTION WITH DEEP CONVOLUTIONAL NEURAL NETWORKS

(71) Applicant: TOYOTA JIDOSHA KABUSHIKI KAISHA, Toyoto-shi, Aichi-ken (JP)

(72) Inventors: Eric Martinson, Mountain View, CA (US); Veeraganesh Yalla, Mountain View, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/048,757

(22) Filed: Feb. 19, 2016

(65) Prior Publication Data
US 2016/0180195 A1      Jun. 23, 2016

Related U.S. Application Data

(63) Continuation-in-part of application No. 14/171,756, filed on Feb. 3, 2014, now Pat. No. 9,355,334.
(Continued)

(51) Int. Cl.
G06K 9/00  (2006.01)
G06K 9/62  (2006.01)
G06N 3/04  (2006.01)

(52) U.S. Cl.
CPC .......... G06K 9/628 (2013.01); G06K 9/00214 (2013.01); G06K 9/00362 (2013.01);
(Continued)

(58) Field of Classification Search
CPC .. G06K 9/628; G06K 9/00362; G06K 9/6202; G06K 9/6256; G06N 3/0472; G06T 7/0081
(Continued)

(56) References Cited

U.S. PATENT DOCUMENTS 6,125,194 A * 9/2000 Yeh .................... G06F 19/321
                                                    382/132
6,973,201 B1 * 12/2005 Colmenarez ....... G06K 9/00369
                                                    382/103
(Continued)

FOREIGN PATENT DOCUMENTS

CN        104850825 A  *  8/2015
CN        104992142 A  *  10/2015

OTHER PUBLICATIONS

"Towards unified depth and semantic prediction from a single image," Peng Wang; Xiaohui Shen; Zhe Lin; Scott Cohen; Brian Price; Alan Yuille, 2015 IEEE Conference on Computer Vision and Pattern Recognition (CVPR) Year: 2015 pp. 2800-2809.*
(Continued)

Primary Examiner — Samir Ahmed
(74) Attorney, Agent, or Firm — Patent Law Works LLP

(57) ABSTRACT

By way of example, the technology disclosed by this document receives image data; extracts a depth image and a color image from the image data; creates a mask image by segmenting the depth image; determines a first likelihood score from the depth image and the mask image using a layered classifier; determines a second likelihood score from the color image and the mask image using a deep convolutional neural network; and determines a class of at least a portion of the image data based on the first likelihood score and the second likelihood score. Further, the technology can pre-filter the mask image using the layered classifier and then use the pre-filtered mask image and the color image to calculate a second likelihood score using the deep convolutional neural network to speed up processing.

20 Claims, 25 Drawing Sheets

Related U.S. Application Data

(60) Provisional application No. 61/874,962, filed on Sep. 6, 2013.

(52) U.S. Cl.
CPC ......... *G06K 9/6202* (2013.01); *G06K 9/6256* (2013.01); *G06N 3/0472* (2013.01)

(58) Field of Classification Search
USPC ........................................................ 382/103
See application file for complete search history.

(56) References Cited

U.S. PATENT DOCUMENTS

| | | | | |
|---|---|---|---|---|
| 7,747,044 | B2 | 6/2010 | Baker et al. | |
| 7,912,246 | B1* | 3/2011 | Moon | G06K 9/00221 |
| | | | | 382/103 |
| 8,131,011 | B2* | 3/2012 | Nevatia | G06K 9/00369 |
| | | | | 382/103 |
| 8,437,506 | B2* | 5/2013 | Williams | G06F 3/011 |
| | | | | 348/46 |
| 8,965,112 | B1* | 2/2015 | Ibarz | G06K 9/6256 |
| | | | | 382/105 |
| 9,224,068 | B1* | 12/2015 | Ranzato | G06K 9/6268 |
| 9,317,785 | B1* | 4/2016 | Moon | G06K 9/6267 |
| 2004/0095374 | A1* | 5/2004 | Jojic | G06T 7/2006 |
| | | | | 715/716 |
| 2005/0063565 | A1* | 3/2005 | Nagaoka | B60R 21/013 |
| | | | | 382/104 |
| 2006/0291697 | A1* | 12/2006 | Luo | G06K 9/00369 |
| | | | | 382/104 |
| 2010/0034457 | A1* | 2/2010 | Berliner | G06K 9/00362 |
| | | | | 382/154 |
| 2010/0329544 | A1* | 12/2010 | Sabe | G06K 9/00288 |
| | | | | 382/159 |
| 2011/0293137 | A1* | 12/2011 | Gurman | G06K 9/00201 |
| | | | | 382/103 |
| 2013/0184592 | A1* | 7/2013 | Venetianer | H04N 7/18 |
| | | | | 600/476 |
| 2014/0037152 | A1 | 2/2014 | Tan et al. | |
| 2014/0171756 | A1 | 6/2014 | Waldorf et al. | |
| 2014/0177947 | A1 | 6/2014 | Krizhevsky et al. | |
| 2014/0180989 | A1 | 6/2014 | Krizhevsky et al. | |
| 2015/0117760 | A1* | 4/2015 | Wang | G06K 9/4628 |
| | | | | 382/157 |
| 2015/0213302 | A1* | 7/2015 | Madabhushi | G06K 9/00147 |
| | | | | 382/133 |
| 2015/0238148 | A1* | 8/2015 | Georgescu | A61B 5/7267 |
| | | | | 600/408 |
| 2015/0278642 | A1* | 10/2015 | Chertok | G06N 3/02 |
| | | | | 382/156 |
| 2015/0347831 | A1* | 12/2015 | Tamatsu | G06K 9/00369 |
| | | | | 382/156 |
| 2016/0104058 | A1* | 4/2016 | He | G06F 17/30247 |
| | | | | 382/156 |

OTHER PUBLICATIONS

"Hybrid RGB-D Object Recognition using Convolutional Neural Network and Fisher Vector," Wei Li, et al, 2015 Chinese Automation Congress (CAC), Conference Location :Wuhan, Nov. 27-29, 2015, pp. 506-511.*

"Large-Margin Multi-Modal Deep Learning for RGB-D Object Recognition," Anran Wang et al, IEEE Transactions on Multimedia, vol. 17, No. 11, Nov. 2015, pp. 1887-1898.*

Choi et al., "Detecting and Tracking People using an RGB-D Camera via Multiple Detector Fusion," Workshop on challenges and Opportunities in Robot Perception, 2011 (8 pages).

Spinello et al., "People detection in RGB-D data." Intelligent Robots and Systems (IROS), 2011 International Conference on. IEEE, 2011 (6 pages).

Krizhevsky et al., "ImageNet Classification with Deep Convolutional Neural Networks." Advances in Neural Information Processing Systems. 2012 (9 pages).

Couprie et al., "Convolutional Nets and Watershed Cuts for Real-Time Semantic Labeling of RGBD Videos." Journal of Machine Learning Research, Oct. 15, 2014 (23 pages).

Martinson et al., "Real-Time Human Detection for Robots using CNN with a Feature-Based Layered Pre-filter," Aug. 2016 (7 pages).

Martinson et al., "Augmenting Deep Convolutional Neural Networks with Depth-Based Layered Detection for Human Detection," Oct. 2016 (7 pages).

\* cited by examiner

| | Face Recognition | Gait Recognition | Head Recognition | Layer-based Recognition |
|---|---|---|---|---|
| Works with Depth Images | True | True | True | True |
| Works when Face is missing | False | True | True | True |
| Single Image Recognition | True | False | True | True |
| Works with missing data from head or shoulders | Maybe | Maybe | False | True |

Figure 8

AUGMENTING LAYER-BASED OBJECT DETECTION WITH DEEP CONVOLUTIONAL NEURAL NETWORKS

CROSS-REFERENCE TO RELATED APPLICATIONS

The present application a continuation-in-part of U.S. patent application Ser. No. 14/171,756, titled "Efficient Layer-Based Object Recognition", filed Feb. 3, 2014, the entire contents of which are incorporated herein by reference.

BACKGROUND

The present disclosure relates to object recognition using layer-based object detection with deep convolutional neural networks.

Today many computer systems and machines rely on person recognition techniques for various different applications. In some example applications, machines and computer systems need to know if there is a human present (or which human is present) at a particular location in order to turn on/off or activate a particular program. Person detection in particular is often a fundamental skill in human robot interaction. In general, a robot needs to know where the person is in order to interact with them.

While some progress has been made at detecting people in public places (e.g., see P. F. Felzenszwalb, R. B. Girshick, D. McAllester and D. Ramanan, "Object Detection with Discriminatively Trained Part Based Models," IEEE Transactions on Pattern Analysis and Machine Intelligence, vol. 32, no. 9, pp. 1627-1645, 2010; and T. Linder and Arras K. O., "People Detection, Tracking and Visualization using ROS on a Mobile Service Robot," in Robot Operating System (ROS): The Complete Reference, Springer, 2016), in other domains, such as a home environment, the challenges are particularly difficult.

One solution that has been developed to improve object recognition is to use a layer-based classification/object detection system to differentiate between classes of objects. The layer-based classification uses a segmented depth image to differentiate between two or more classes of people. However, one common error that is present in the layer-based classification using depth images, especially in a moving object detection system (such as a robot) when the system approaches a square object at an off angle (e.g. 45 degrees), then that object will appear curved in the depth image, making it difficult to distinguish from people. In moving object detection systems, a false positive classification that happens when a robot approaches an object at an unusual angle can result in a robot becoming stuck.

Another solution that has been developed to improve object recognition is to use a deep convolutional neural network to classify objects and/or images. The use of deep convolutional neural networks to classify objects and/or images is a relatively recent phenomenon. Although the algorithm itself is many decades old, there has been significant recent work in optimizing these algorithms for large data sets and improving their speed and precision. Most notably, work published by Krizhevsky, Sutskever and Hinton at the University of Toronto detailed a specific network architecture, referred to as "AlexNet," that performed well on the large object recognition challenge, ImageNet. See A. Krizhevsky, I. Sutskever and G. Hinton, "ImageNet Classification with Deep Convolutional Neural Networks," in Neural Information Processing (NIPS), Lake Tahoe, Nev., USA, 2012.

The deep convolutional neural network often utilizes RGB images to classify objects and/or images. While recent improvements to the deep convolutional neural network have shown success at large object image recognition as well as increasing the size of the training set and tolerance of noise, the deep convolutional neural network suffers from a significant weakness. The deep convolutional neural network is overly reliant on single sending modality (e.g. RGB image data). Not only is segmenting in RGB much more difficult and computationally expensive, but the classifier itself emphasizes learning a decision boundary based on edges and textures, features that may not be the only, or even the best, choice depending on the sensing modality and the object being recognized.

In addition, AlexNet, however, does not solve the segmentation problem—when restricted to color images, other algorithms like graph cuts were used to extract object-bounding boxes and then classified. See R. Girshick, J. Donahue, T. Darrell and J. Malik, "Rich feature hierarchies for accurate object detection and semantic segmentation," in Computer Vision and Pattern Recognition, Columbus, Ohio, 2014. Alternatively, there has been a notable effort to move beyond the single modality limitations by incorporating depth. See C. Couprie, C. Farabet, L. Najman and Y. LeCun, "Convolutional Nets and Watershed Cuts for Real-Time Semantic Labeling of RGBD Videos," Journal of Machine Learning Research, vol. 15 (October), pp. 3489-3511, 2014.

Couprie et al exponentially reduce the number of bounding boxes to evaluate by applying watershed cuts to depth images for image segmentation prior to RGB classification. Gupta et al go step further by including the depth data in the segmentation and classification step. See S. Gupta, R. Girshick, P. Arbeláez and J. Malik, "Learning Rich Features from RGB-D Images for Object Detection and Segmentation," in European Conference on Computer Vision, Zurich, Switzerland, 2014. Their work, however, requires knowledge of the camera orientation in order to estimate both height above ground and angle with gravity for every pixel in the image for use with AlexNet.

Within the domain of person detection there is also multimodal fusion work focused on improving specific classifiers using a combination of RGB and depth information. People can be detected in depth data alone, as demonstrated by previous work in layered person detection and contour estimation, as well as and they can be detected in monocular camera data, either color or grayscale images. See E. Martinson, "Detecting Occluded People for Robotic Guidance," in Robots and Human Interactive Communication (RO-MAN), Edinburgh, UK, 2014; L. Spinello, K. Arras, R. Triebel and R. Siewart, "A Layered Approach to People Detection in 3D Range Data," in Proc. of the AAAI Conf. on Artificial Intelligence: Physically Grounded AI Track, Atlanta, Ga., 2010; and N. Kirchner, A. Alempijevic, A. Virgona, X. Dai, P. Ploger and R. Venkat, "A Robust People Detection. Tracking and Counting System," in Australian Conf. on Robotics and Automation, Melbourne, Australia, 2014.

But the advantage of using the two modalities is that the failure points for depth-based recognition are not the same as the failure points for color based recognition. Given a registered color and depth image, a number of systems have been developed to take advantage of the fusion of these two modalities.

The method described by Spinello and Arras (Univ. of Freiburg) fuses these two modalities by applying similar classifiers in each domain. See L. Spinello and K. Arras, "People Detection in RGB-D Data," in Int. Conf. on Intelligent Robots and Systems (IROS), San Francisco, USA, 2011. The depth image is used to first identify regions of interest based on groups of neighboring pixels. Then the histogram of oriented gradients, originally developed for object recognition in RGB images, and widely used in color based person detection, is calculated for regions of interest in the color image. A second, related algorithm, the histogram of oriented depths, is then applied to the depth image objects, and the resulting combined vector is classified using a support vector machine. More recent work from Freiburg (see above) integrates other publically available detectors including one included with the point cloud library. See M. Munaro, F. Basso, E. Menegatti., "Tracking people within groups with RGB-D data," in International Conference on Intelligent Robots and Systems (IROS) 2012, Villamoura, Portugal, 2012.

Another related RGB-D classification system was published by the University of Michigan, whereby additional modalities such as motion cues, skin color, and detected faces are also added to a combined classification system. See W. Choi, C. Pantofaru, S. Savarese, "Detecting and Tracking People using an RGB-D Camera via Multiple Detector Fusion," in Workshop on Challenges and Opportunities in Robot Perception (in conjunction with ICCV-11), 2011. Although both of these methods make use of classifiers from both the RGB and depth domain, neither one takes advantage of the precision increase a convolutional neural network can enable. Where the first method uses two very similar classifiers (HOG vs HOD) to handle the cross-domain fusion, the system is learning the same decision boundary and will fail when that decision boundary is difficult to identify. The second method, by contrast, employs a variety of different detectors across different domains. However, the majority (e.g. motion cues, skin color, and face detection) are very weak classifiers in the general detection problem, as opposed to convolutional neural networks.

Therefore, a solution is needed that both reduces errors in classifying depth images, without the increased process time and computational difficulty of the convolutional neural network.

SUMMARY

According to one innovative aspect of the subject matter described in this disclosure, a system includes one or more processors and one or more memories storing instructions that, when executed by the one or more processors, cause the system to: receive image data; extract a depth image and a color image from the image data; create a mask image by segmenting the depth image; determine a first likelihood score from the depth image and the mask image using a layered classifier; determine a second likelihood score from the color image and mask image using a deep convolutional neural network; and determine a class of at least a portion of the image data based on the first likelihood score and the second likelihood score.

In general, another innovative aspect of the subject matter described in this disclosure may be embodied in methods that include receiving image data; creating a mask image by segmenting the image data into a plurality of components; determining a first likelihood score from the image data and the mask image using a layered classifier; determining a second likelihood score from the image data and the mask image using a deep convolutional neural network (CNN); and determining a class for at least a portion of the image data based on the first likelihood score and the second likelihood score.

Other aspects include corresponding methods, systems, apparatus, and computer program products for these and other innovative aspects. These and other implementations may each optionally include one or more of the following features and/or operations. For instance, the features and/or operations include: extracting a first image from the image data; generating an object image by copying pixels from the first image of the components in the mask image; classifying the object image using the deep CNN; generating classification likelihood scores indicating probabilities of the object image belonging to different classes of the deep CNN; generating the second likelihood score based on the classification likelihood scores; that the first image is one of a color image, a depth image, and a combination of a color image and a depth image; fusing the first likelihoods score and the second likelihoods score together into an overall likelihood score and responsive to satisfying a predetermined threshold with the overall likelihood score, classifying the at least the portion of the image data as representing a person using the overall likelihood score; extracting a depth image and a color image from the image data; that determining the first likelihood score from the image data and the mask image using the layered classifier includes determining the first likelihood score from the depth image and the mask image using the layered classifier, and determining the second likelihood score from the image data and the mask image using the deep CNN includes determining the second likelihood score from the color image and the mask image using the deep CNN; that the deep CNN has a soft max layer as a final layer to generate the second likelihood score that the at least the portion of the image data represents a person; converting the first likelihood score and the second likelihood score into a first log likelihood value and a second log likelihood value; and calculating a combined likelihood score by using a weighted summation of the first log likelihood value and the second log likelihood value; that the class is a person.

The novel detection technology presented in this disclosure is particularly advantageous in a number of respects. For example, the technology described herein can increase precision of the different sensors across different environments without sacrificing recall. Even within domains in which individual classifiers have been demonstrated to be particularly strong, the fusion of the layered classifier and convolutional neural network improves performance. Further, the technology described herein can increase precision by using different types of decision boundaries learned by the layered classifier and convolutional neural network. Where the layered system focuses on the geometry of the layer of pixels in image data, the neural network emphasizes boundaries and contours. Further, the disclosed technology can achieve increased precision and identification in a wider variety of environments without rendering false positives as with the solutions discussed in the Background.

The disclosure is illustrated by way of example, and not by way of limitation in the figures of the accompanying drawings in which like reference numerals are used to refer to similar elements.

BRIEF DESCRIPTION OF THE DRAWINGS

FIG. 8 is a table describing various non-limiting advantages of the novel layer-based detection technology disclosed herein.

DESCRIPTION

The detection technology described herein can efficiently and effectively detect and recognize unique objects such as people and non-people from image data, such as depth images, color images, etc. In an example embodiment, the technology fuses information relating to the both the depth images and color images into a single likelihood score using a layered classifier and a convolutional neural network (CNN) classifier. The technology can advantageously recognize objects (e.g., people) in depth images even when important aspects of those objects (e.g., a person's head or shoulders) are occluded. In essence, an occlusion means that a part of an object (e.g., a portion of a person's body) in a scene being recorded is blocked from view (e.g., from the camera's perspective). Occlusions may be caused by a number of variables. For instance, occlusions may be caused by, but are not limited to: 1) physical objects in frame that block part of the person from view; 2) the edge of the camera image plane; and 3) other artifacts that may block or obscure objects in images from being visible, such as lighting, focus, noise, etc., during capture, etc.

In a non-limiting example, the detection technology includes computer-implemented algorithms that recognize objects in depth images by comparing object segments (also called layers) to reference surfaces (e.g., a convex parabola and a line). The detection technology may require a minimum of parameters be estimated for each 2D segment of the object, from which a classifier can be rapidly trained to separate people from objects. Combining the 2D scans can then result in >90% recognition precision.

The detection technology is applicable in numerous areas, including in exploring people detection in real environments, extending recognition to people carrying objects, and working in non-upright poses including people lying down or bent over. In general, is to make detection work in every environment that a person might want to interact with an intelligent computing device.

Figure 1:
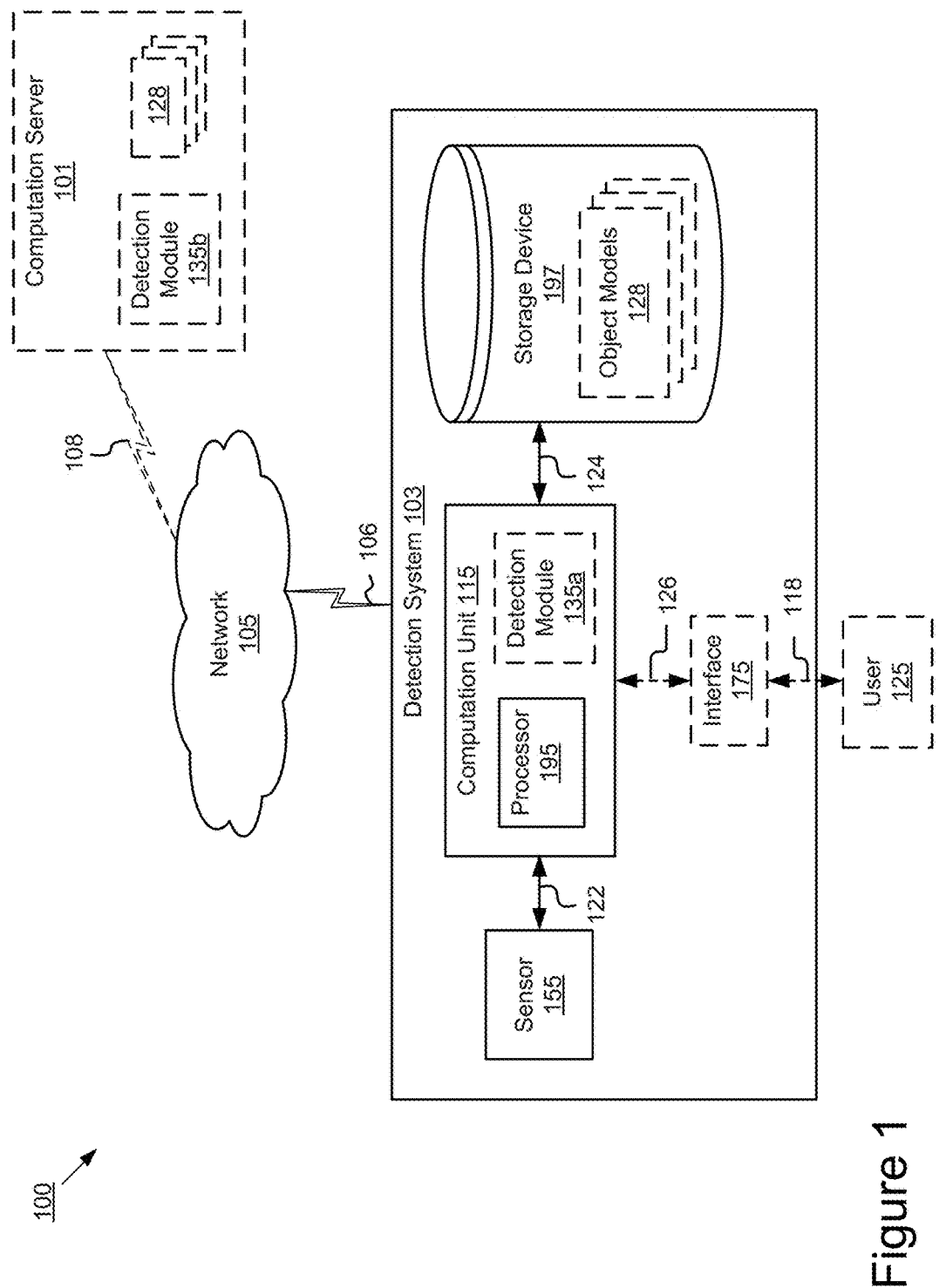
FIG. 1 is a block diagram of an example system for recognizing image objects.

FIG. 1 is a block diagram of an example system 100 for recognizing objects. As illustrated, the system 100 may include a computation server 101 and/or a detection system 103 that may be accessed and/or interacted with by a user 125 (as depicted by signal line 118). Depending on the implementation, the system may or may not include a computation server 101. In embodiments where a computation server 101 is included, the detection system 103 and the computation server 101 may be communicatively coupled via a network 105 via signal lines 106 and 108, respectively. For example, the detection system 103 and the computation server 101 may be communicatively coupled to each other via the network 105 to exchange data, such as sensor data, recognition data, etc. The signal lines 106 and 108 in FIG. 1 may be representative of one or more wired and/or wireless connections. As a further example, the detection system 103 may transmit sensor data to the computation server 101 for processing and the computation server 101 may process the data as described herein to detect and recognize objects and send data and/or results describing the recognized objects to the detection system 103 for use thereby during operation. In embodiments where a computation server 101 is not included, the detection system 103 may operate autonomously or in conjunction with other detection systems 103 (not visible) to detect and recognize objects. For instance, a detection system 103 may be networked via a computer network with other similar detection systems 103 to perform the computations discussed herein.

While FIG. 1 depicts a single detection system 103 and computation server 101, it should be understood that a variety of different system environments and configurations are possible, contemplated, and within the scope of the present disclosure. For instance, some embodiments may include additional or fewer computing devices, services, and/or networks, and may implement various functionality locally or remotely on other computing devices. Further, various entities may be integrated into to a single computing device or system or distributed across additional computing devices or systems, etc. For example, the detection module 135 may be stored in, executable by, and distributed across a combination of computing devices and/or systems or in one computing device and/or system.

The network 105 may include a conventional type network, wired or wireless, and may have any number of configurations, such as a star configuration, token ring configuration, or other known configurations. The network 105 may include one or more local area networks ("LANs"), wide area networks ("WANs") (e.g., the Internet), virtual private networks ("VPNs"), peer-to-peer networks, nearfield networks (e.g., Bluetooth™), cellular networks (e.g., 3G, 4G, other generations), and/or any other interconnected data path across which multiple computing nodes may communicate. Data may be transmitted in encrypted or unencrypted form between the nodes of the network 105 using a variety of different communication protocols including, for example, various Internet layer, transport layer, or application layer protocols. For example, data may be transmitted via the networks using transmission control protocol/ Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other known protocols.

The detection system 103 may be representative of or included in an autonomous computing system capable of perceiving, recognizing, and interpreting the significance of objects within its environment to perform an action. For example, the detection system 103 may be representative of or incorporated into an intelligent car having the capability of recognizing a particular driver or passenger inside the car. In further examples, the detection system 103 may be representative of or incorporated into a social robot that can cooperate with humans and/or other robots to perform various tasks, or an autonomous system operating in populated environments. In some embodiments, the detection system 103 may be incorporated in other systems as a component for detecting and recognizing objects. For instance, the detection system 103 may be incorporated into a client device such as a gaming system, television, mobile phone, tablet, laptop, workstation, server, etc. For example, the detection system 103 may be embedded in a machine or computer system for determining if a certain person or persons are present at a particular location and the machine or computer system can turn on/off or execute a particular program if that certain person or persons are present at the particular location.

In some embodiments, the detection system 103 may include a sensor 155, a computation unit 115 that includes a processor 195 and an instance 135a of the detection module, a storage device 197 storing a set of object models 128, and/or an interface 175. As depicted, the sensor 155 is communicatively coupled to the computation unit 115 via signal line 122. The storage device 197 is communicatively coupled to the computation unit 115 via signal line 124. The interface 175 is communicatively coupled to the computation unit 115 via signal line 126. In some embodiments, an instance 135b of the detection module, or various components thereof, can be stored on and executable by the computation server 101, as described elsewhere herein. The instances of the detection module 135a and 135b are also referred to herein individually and/or collectively as the detection module 135.

Although single instances of each of the computation unit 115, sensor 155, storage device 197 and interface 175 are depicted in FIG. 1, it should be recognized that the detection system 103 can include any number of computation units 115, sensors 155, storage devices 197 and/or interfaces 175. Furthermore, it should be appreciated that depending on the configuration the detection system 103 may include other elements not shown in FIG. 1, such as an operating system, programs, various additional sensors, motors, movement assemblies, input/output devices like a speaker, a display device, a transceiver unit and an antenna for wireless communication with other with other devices (e.g., the computation server 101, other detection systems 103 (not shown), any other appropriate systems (not shown) communicatively coupled to the network 105, etc.

The sensor 155 may include one or more sensors configured to capture light and other signals from the surrounding environment and to generate and/or processes sensor data, such as depth data, therefrom. For instance the sensor 155 may include a range camera, such as but not limited to an RGB-D camera, a stereo camera, a structured light camera/ scanner, time-of-flight camera, interferometer, modulation imager, a laser rangefinder, a light-field camera, an intensified CCD camera, etc., although it should be understood that other types of sensors may be used, such as but not limited to an ultrasound sensor, a color camera, an infrared camera, etc. In some embodiments, the sensor 155 and/or detection system 103 may include a combination of different types of sensors, such as accelerometers, gyroscopes, thermometers, barometers, thermocouples, or other conventional sensing devices. Swiss Ranger sensor by MESA Imaging, Kinect sensor by Microsoft, various stereo vision systems, etc., are further non-limiting examples of cameras that the sensor 155 may include. The sensor 155 may be incorporated into the computation unit 115 or may be a disparate device that is coupled thereto via a wireless or wired connection.

In various embodiments, the sensor 155 may generate and send the depth data describing distance information associated with objects captured by the sensor 155 to the computation unit 115 and/or the computation server 101 for processing, as described elsewhere herein.

Figure 2A:
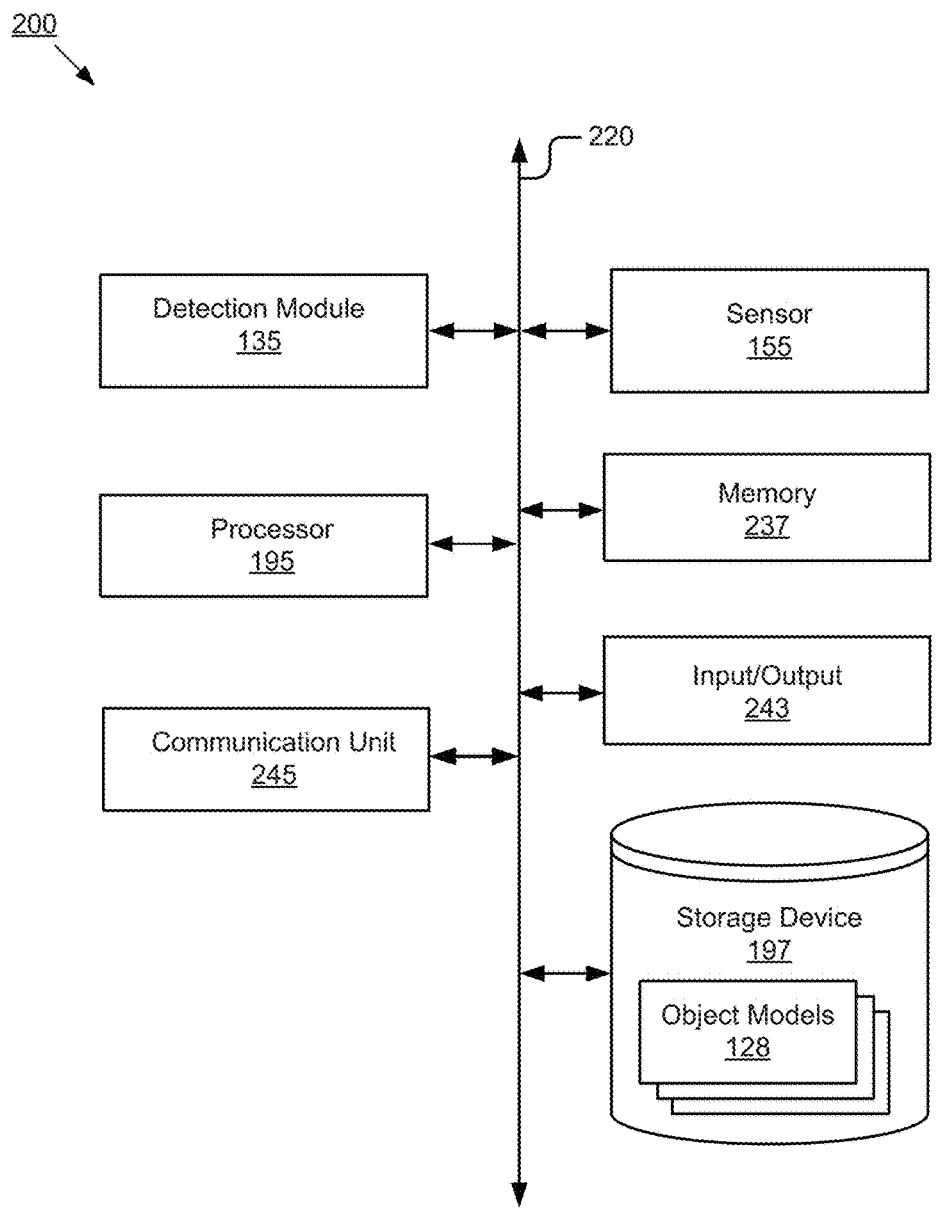
FIG. 2A is a block diagram of an example computing device.

The computation unit 115 may include any processor-based computing device, such as the computing device 200 depicted in FIG. 2A. In an embodiment, the computation unit 115 may receive sensor data from the sensor 155, process the sensor data, generate and/or provide results for presentation via the interface 174 based on the processing, trigger various programs based on the processing, control the behavior and/or movement of the detection system 103 or associated systems based on the processing, cooperate with the computation server 101 to process the sensor data, etc., as described elsewhere herein. In some embodiments, the computation unit 115 may store the processed sensor data and/or any results processed therefrom in the storage device 197. The processor 195 and the detection module 135 are described in detail with reference to at least FIGS. 2A-19.

The interface 175 is a device configured to handle communications between the user 125 and the computation unit 115. For example, the interface 175 includes one or more of a screen for displaying detection information to the user 125; a speaker for outputting sound information to the user 125; a microphone for capturing sound and/or voice commands; and any other input/output components facilitating the communications with the user 125. In some embodiments, the interface 175 is configured to transmit an output from the computation unit 115 to the user 125. For example, the interface 175 includes an audio system for playing a voice greeting to the user 125 responsive to the computation unit 115 detecting that the user 125 is within the vicinity. It should be understood that the interface 175 may include other types of devices for providing the functionality described herein.

The user 125 may be a human user. In one embodiment, the user 125 is driver or a passenger sitting in a vehicle on a road. In another embodiment, the user 125 is a human that interacts with a robot. In a further embodiment, the user is a conventional user of a computing device. The user 125 may interact with, or otherwise provide inputs to and/or receives outputs from, the interface 175 which sends and receives different types of data to and from the computation unit 115.

The storage device 197 includes a non-transitory storage medium that stores data. For example, the storage device 197 includes one or more of a dynamic random access memory (DRAM) device, a static random access memory (SRAM) device, flash memory, a hard disk drive, a floppy disk drive, a disk-based memory device (e.g., CD, DVD, Blue-Ray™, etc.), a flash memory device, or some other known non-volatile storage device. The storage device 197 may be included in the detection system 197 or in another computing device and/or storage system distinct from but coupled to or accessible by the detection system 197. In some embodiments, the storage device 197 may store data in association with a database management system (DBMS) operable by the detection system 103 and/or the computation server 101. For example, the DBMS could include a structured query language (SQL) DBMS, a NoSQL DMBS, etc. In some instances, the DBMS may store data in multi-dimensional tables comprised of rows and columns, and manipulate, i.e., insert, query, update and/or delete, rows of data using programmatic operations.

The computation server 101 is any computing device having a processor (not pictured) and a computer-readable storage medium (e.g., a memory) (not pictured) to facilitate the detection system 103 to detect and recognize objects. In some embodiments, the computation server 101 includes an instance 135*b* of the detection module. In network-based embodiments, the computation server 101 receives sensor data (e.g., depth data) from the detection system 103, processes the sensor data, and sends any result of processing to the detection system 103.

FIG. 2 is a block diagram of a computing device 200 that includes a detection module 135, a processor 195, a memory 237, a communication unit 245, a sensor 155, and a storage device 197 according to the illustrated embodiment. The components of the computing device 200 are communicatively coupled by a bus 220. In some embodiments, the computing device 200 is representative of the architecture of a detection system 103 and/or a computation server 101.

The memory 237 may store and provide access to data to the other components of the computing device 200. In some implementations, the memory 237 may store instructions and/or data that may be executed by the processor 195. For instance, the memory 237 may store the detection module 135 and/or components thereof. The memory 237 is also capable of storing other instructions and data, including, for example, an operating system, hardware drivers, other software applications, databases, etc. The memory 237 may be coupled to the bus 220 for communication with the processor 195 and the other components of the computing device 200.

The memory 237 includes one or more non-transitory computer-usable (e.g., readable, writeable, etc.) media, which can include an apparatus or device that can contain, store, communicate, propagate or transport instructions, data, computer programs, software, code, routines, etc., for processing by or in connection with the processor 195. In some implementations, the memory 237 may include one or more of volatile memory and non-volatile memory. For example, the memory 237 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 237 may be a single device or may include multiple types of devices and configurations.

The communication unit 245 transmits data to and receives data from other computing devices to which it is communicatively coupled using wireless and/or wired connections. The communication unit 245 may include one or more wired interfaces and/or wireless transceivers for sending and receiving data. The communication unit 245 may couple to the network 105 and communicate with other computing nodes, such as the detection system 103 and/or the computation server 101 (depending on the configuration) . The communication unit 245 may exchange data with other computing nodes using standard communication methods, such as those discussed above regarding the network 105.

The detection module 135 may be coupled to the sensor 155 to receive sensor data. In some embodiments, the sensor data received from the sensor 155 may include image data such as depth data describing a depth image, data describing a color image, other types of image data, etc. The image data may be an image depicting a scene including one or more objects. An object may be a living or a non-living object, an animate or inanimate object, etc. Example objects include but are not limited humans, animals, furniture, fixtures, cars, utensils, etc. The detection module 135 can efficiently recognize objects by extracting blobs associated with the objects, segmenting the blobs into layers, generating likelihoods, classifying the objects associated with the blobs using the layers and likelihoods, etc.

In various embodiments, the detection module 135 may be executable to extract one or more blobs representing one or more objects from the depth data of the image data, classify the blobs as describing people or non-people objects, segment the blobs into layers, compare the layers of each blob to a set of object models to determine the identity of the object associated with the blob (e.g., recognize the specific individual associated with a person blob), etc. In various further embodiments, the detection module 135 may be executable to further extract a color image (e.g. RGB image) from the image data and use a deep convolutional neural network to determine edges and boundaries in the color image, determine blobs in the color image using the edges and boundaries generate a classification score for the color image of a likelihood that the blob is a person, or in some embodiments a specific individual. Numerous further acts are also possible as discussed further elsewhere herein.

Figure 2B:
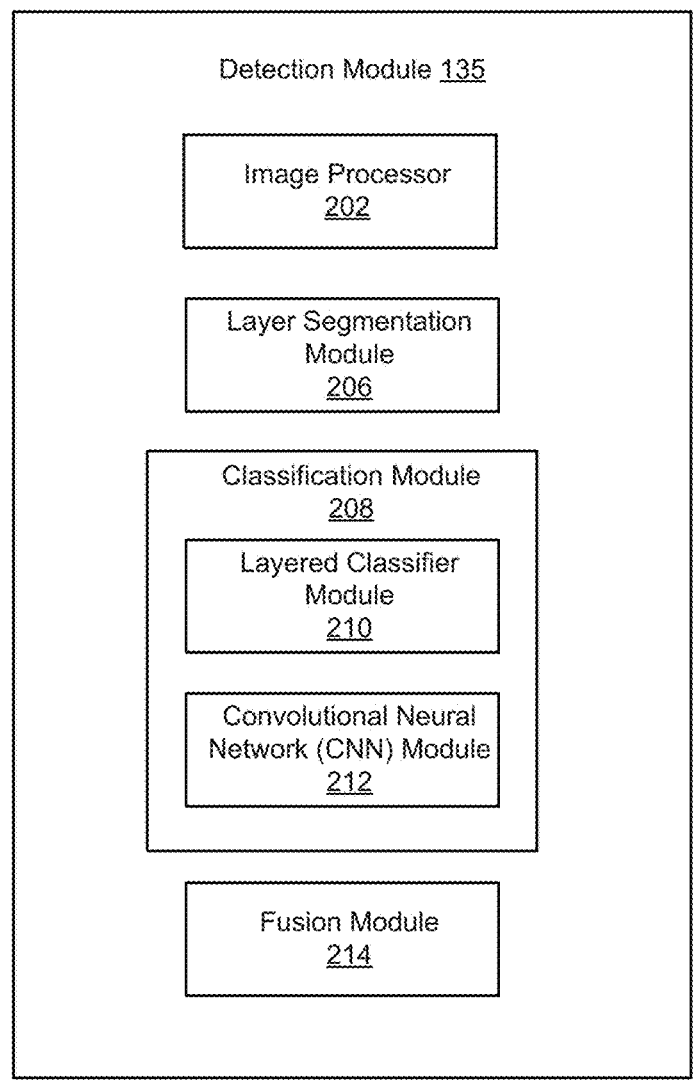
FIG. 2B is a block diagram of an example detection module.

As shown in FIG. 2B, which depicts an example detection module 136, the detection module 136 may include an image processor 202, a layer segmentation module 206, a classification module 208, the classification module including both a layered classifier module 210 and a CNN module 212, and a fusion module 214, although it should be understood that the detection module 136 may include additional components such as a registration module, a training module, etc., and/or that various components may be combined into a single module or divided into additional modules.

The image processor 202, the layer segmentation module 206, and/or the classification module 208 may be implemented as software, hardware, or a combination of the foregoing. In some implementations, the image processor 202, the layer segmentation module 206, and/or the classification module 208 may be communicatively coupled by the bus 220 and/or the processor 195 to one another and/or the other components of the computing device 200. In some implementations, one or more of the components 135, 202, 204, and/or 206 are sets of instructions executable by the processor 195 to provide their functionality. In further implementations, one or more of the components 135, 202, 204, and/or 206 are stored in the memory 237 and are accessible and executable by the processor 195 to provide their functionality. In any of the foregoing implementations, these components 135, 202, 204, and/or 206 may be adapted for cooperation and communication with the processor 195 and other components of the computing device 200.

The image processor 202 may be communicatively coupled to the sensor 155 to receive sensor data and may process the sensor data to extract image data such as depth data and color data. In some embodiments, the image processor 202 may extract blobs of objects depicted by the image. In some embodiments, the sensor data may include depth image data describing the position of the objects relative to a point of reference. For example, the sensor 155 may include a multi-dimensional depth sensor that generates multi-dimensional (e.g., 3D) data describing a depth image including object(s) captured by the sensor 155. In some embodiments, the sensor data may include color data describing the colors of different pixels in the image, such as an RGB image. The color image data may include RGB values for the pixels forming the object(s) in the image. In some cases, the depth image data may include positional information associated with the object(s), such as a multi-dimensional (e.g., 3D) depth point cloud in form of an array of triplets or spatial coordinates. In some cases, the depth image data may include the column and row number of each pixel represent its X and Y coordinates and the value of the pixel represents its Z coordinate.

The image processor 202 may use the depth image data describing the depth images captured by the sensor 155 to determine the discrete object(s) included in the depth images. Using depth imaging can provide various advantages including simplifying object segmentation. In depth images, objects can often be separated from each other in the image by their relative depth. For instance, two adjacent pixels having the same relative distance (as measured from a given point of reference such as the sensor 155 location) are likely to belong to the same object, but two pixels having significantly different distances relative to the point of reference likely belong to different objects in the image. This can be helpful to more easily distinguish freestanding objects from one another.

Figure 6:
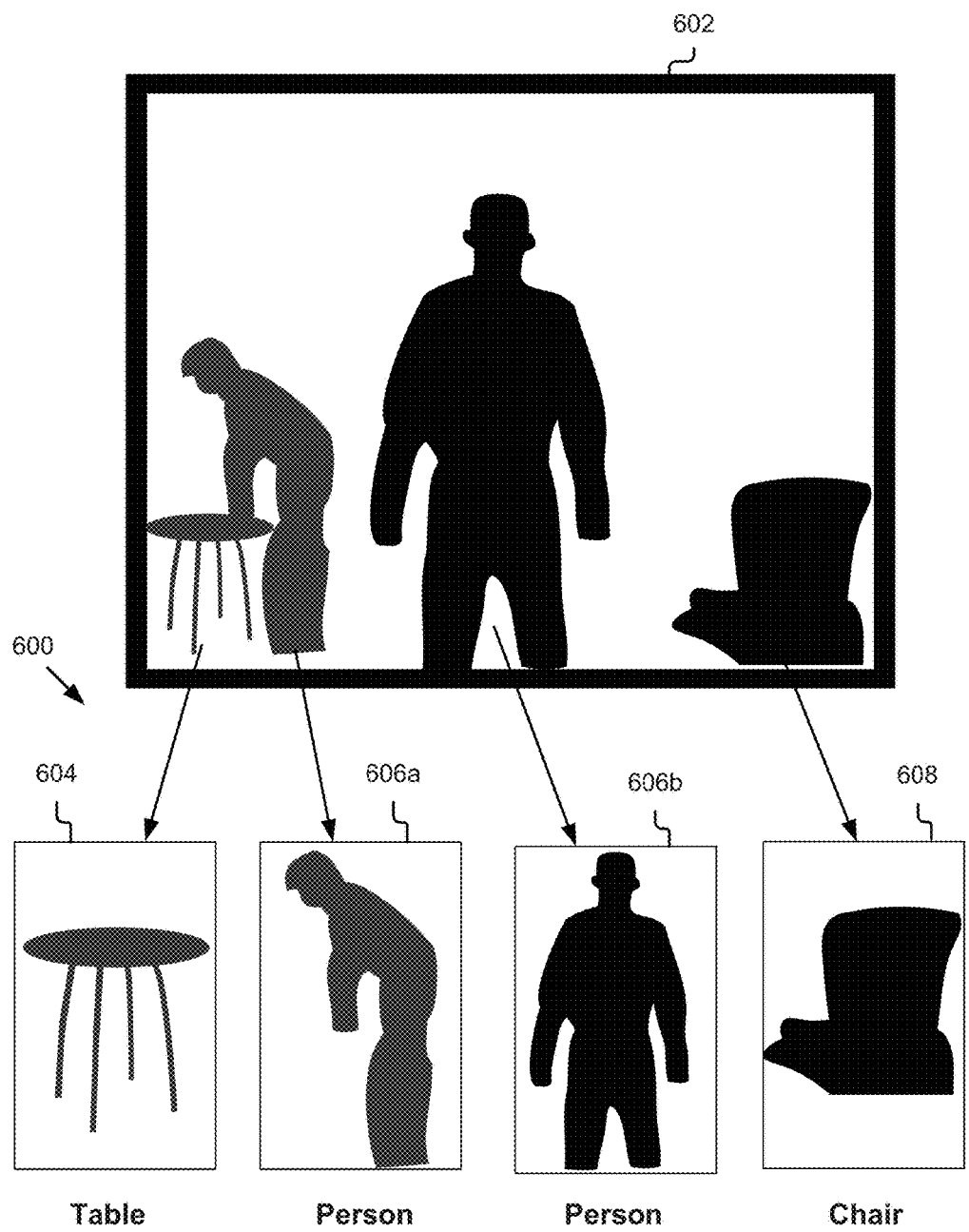
FIG. 6 depicts example blobs extracted from an example depth image.

FIG. 6 demonstrates example object blobs 600 extracted from an example depth image 602. In particular, the depth image 602 depicts a man in a central portion of the frame with another person leaning over a table on the left of the frame and a chair on the right portion of the frame. The image processor 202 processes the data describing the depth image to extract blobs representing the objects, such as blob 604 representing the table, blob 606a representing the person leaning on the table, the blob 606b representing the person in center frame, and blob 608 representing the chair.

In some embodiments, to extract blobs from a depth image, the image processor 202 may estimate positional data for the pixels in the depth image using the distance data associated with those pixels and may apply a flood fill algorithm to adjacent/connected pixels with corresponding depths to determine blobs for the object(s) formed by the pixels. In some embodiments, the image processor 202 may filter out any pixels in the depth image that do not have any distance data associated with them prior to estimating the position data to reduce the amount of processing that is required. Additionally or alternatively, after determining the blobs, the image processor 202 may filter out blobs that are smaller than a certain size (e.g., 500 pixels) to eliminating processing of blobs that are likely to be inconsequential.

In some further blob extraction embodiments, using the focal length of the camera (e.g., sensor 155) and the depth image, the image processor 202 may extract Z, X, and Y coordinates (e.g., measured in feet, meters, etc.). The image processor 202 may then filter the depth image. In particular, the image processor 202 may remove all pixels that have depth that do not fall within a certain rage (e.g., 0.5-6.0 meters). Assuming a point of reference (e.g., a planar surface on which the camera is mounted that is parallel to the floor), the image processor 202 may estimate the X and Y coordinates of each pixel using the following formula:

$$x(\text{row}, col) = \frac{(col_{center} - col) * Z(\text{row}, col)}{\text{focal\_length}}$$

$$y(\text{row}, col) = \frac{(\text{row}_{center} - \text{row}) * Z(\text{row}, col)}{\text{focal\_length}},$$

where focal_length is the camera focal length. The image processor 202 may then remove certain pixels based on their X, Y location.

The image processor 202 may then apply a flood fill algorithm to the pixels of the depth image connected together within a certain depth threshold (e.g., 5 cm) to produce blobs describing one or more object(s) in the depth image. The image processor 202 can remove blobs that are smaller than a certain size (e.g., 500 pixels). The remaining blobs may then be analyzed (e.g., classified, segmented into layers, and matched to objects models), as discussed in further detail herein.

In some embodiments, the image processor 202 may pre-classify the blobs based on their shape to reduce the number of blobs that ultimately need to be segmented and classified. This can reduce processing time when certain types of blobs may not need to be processed. For instance, in some cases only people blobs may need to be recognized by the detection module 135, and the image processor 202 may discard any blobs associated with non-people objects. The image processor 202 may pre-classify objects based on the overall shapes of their blobs. For instance, people blobs generally have certain unique human characteristics that distinguish them from non-person blobs, such as a head and shoulder regions, leg regions, arm regions, torso regions, etc. The image processor 202 may analyze the blobs to determine whether their outlines/shapes include one or more of these human characteristics, and if so, may classify them as person object types.

The layer segmentation module 206 may be coupled to the image processor 202, the memory 237, the communication unit 245, or another component to receive data describing one or more blobs detected from the sensor data, may segment each blob into a set of layers, and may calculate one or more properties associated with each layer and generate a mask image of the data to provide to the classification module 208. The mask image data may be data in which different pixels in the segments are grouped together (e.g. blobs) and labeled. A particular object, such as a certain person, can be uniquely described by the collection of the layers (e.g., horizontal slices). The segmentation performed by the layer segmentation module 206 is also referred to herein in various places as slicing or transforming. The set of layers may be a series of contiguous segments extending from one side of the blob to another. The set of layers may represent a sampling of various portions of the blob. This provides the benefit of maintaining a highly accurate recognition rate while increasing computational efficiency by not processing the entire blob. In some embodiments, the segments are substantially parallel and have a predetermined thickness. The spacing between segments may be uniform, non-uniform, or random in nature depending on the embodiment. In some embodiments, the layers may be horizontal layers. In other embodiments, the layers may be vertical or diagonal layers. Also, while the layers are depicted as being substantially flat, it should be understood that layers that are non-flat may also be used.

Figure 7:
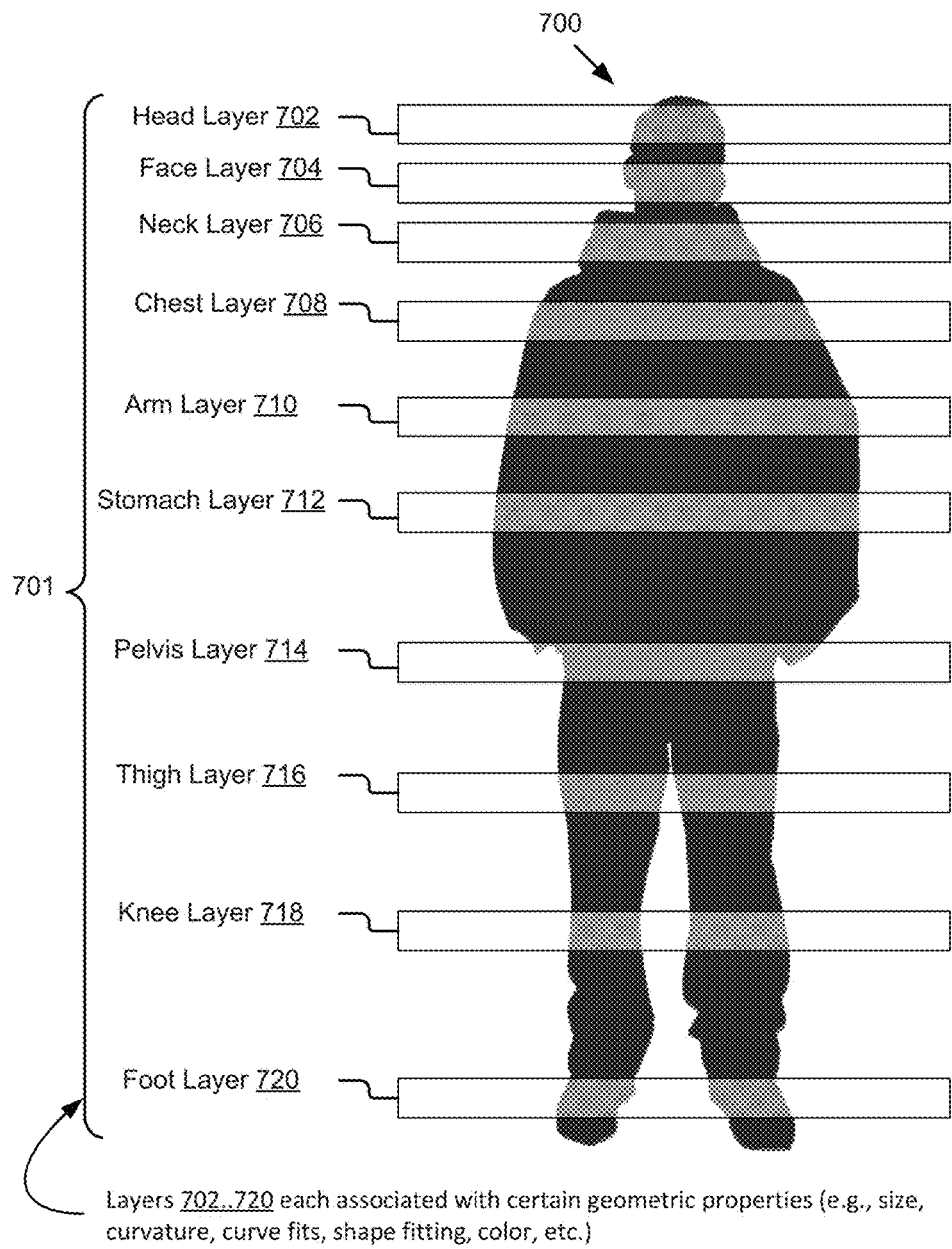
FIG. 7 is a diagram showing an example segmentation of a person blob into a plurality of layers.

As a further example, for a person blob, the layer segmentation module 206 may segment the blob in locations estimated to be most relevant. For instance, a person blob may be segmented in locations corresponding to various notable body parts, as shown in FIG. 7 and described in further detail below. The layer segmentation module 206 may in some cases filter-out layers having a length that does not meet a certain minimum length (e.g., five pixels in length) and may process each of the remaining layers/segments to determine geometric properties for that layer. In some embodiments, the layer segmentation module 206 may base the segmentation scheme applied on the object type pre-classified by the image processor 202. The object type may be received from the image processor 202, the memory 237, the communication unit 245, or another component.

FIG. 7 is a diagram showing an example segmentation of a person blob 700 into a plurality of layers 701. In some embodiments, the layer segmentation module 206 may segment the person blob 700 in regions that correspond to notable body parts. For instance, the set of layers 701 determined by the layer segmentation module 206 may include one or more of a head layer 702, a face layer 704, a neck layer 706, a chest layer 708, an arm layer 710, a stomach layer 712, a pelvis layer 714, a thigh layer 716, a knee layer 718, and a foot layer 720. For each of the layers 702 . . . 720, the layer segmentation module 206 may determine one or more properties. In some embodiments, a property may describe the size, curvature, a curve fit, a shape fit, etc., associated with the layer, as described elsewhere herein.

The artificial environments that people live in, whether inside or outside in the city, include many more surfaces that are flat or at least much less curved than people. People by contrast, are generally curved all over. For instance, people's heads, arms, legs, chest, etc., generally all have some curvature to them. As a result, even if only part of a person is visible, that part is likely to have some curvature. Accordingly, the segmentation module 204 can process the layers segmented by it from a given blob to determine their unique curvature properties, which are then used by the classification module 208 to identify the blob. As few as six properties in some cases may accurately characterize curvature associated with a blob at close range.

Figure 9:
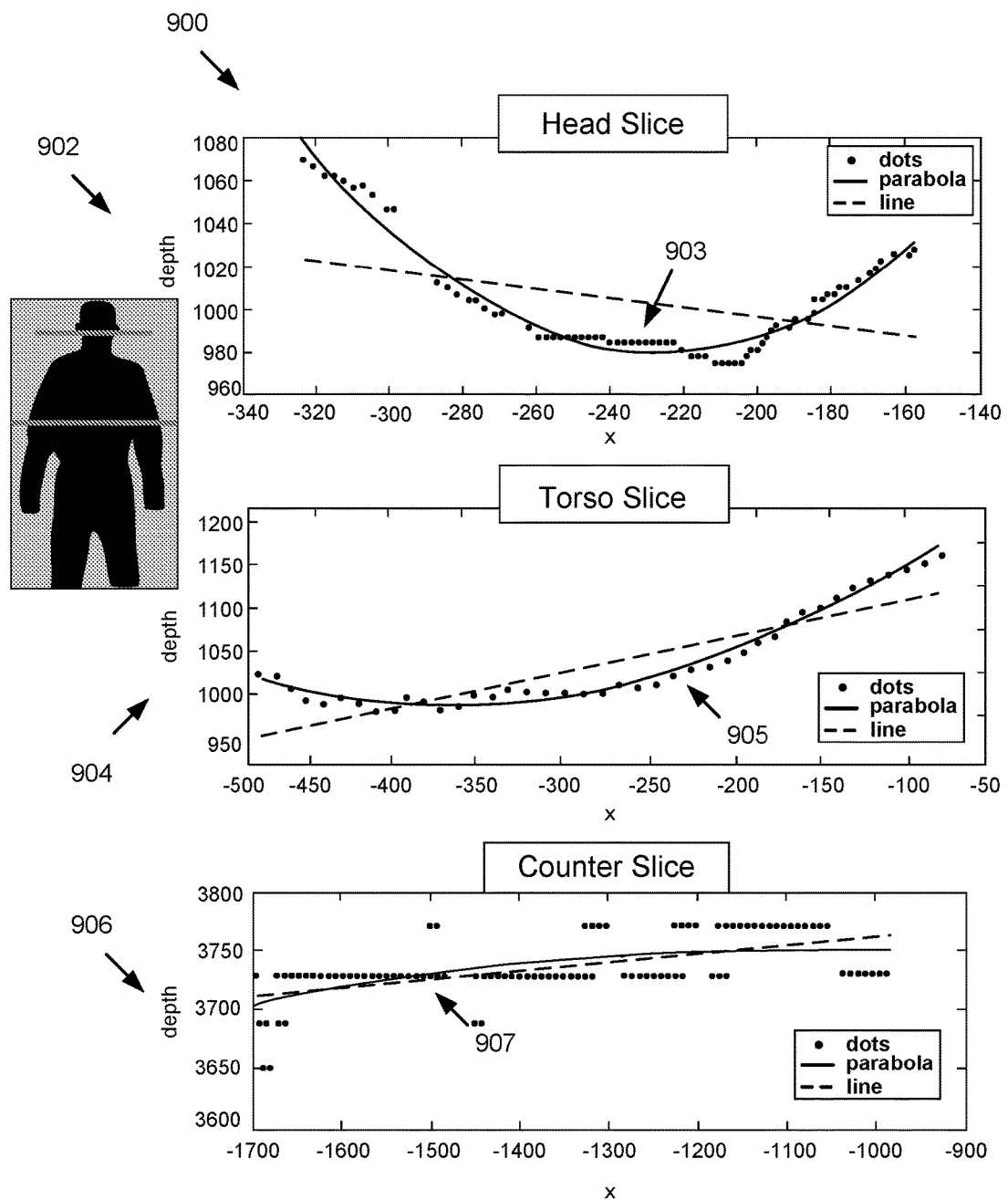
FIG. 9 depicts example layers extracted from an upright person blob processed from a depth image.

In some embodiments, the layer segmentation module 206 may determine layer curvature by fitting a line and a parabola to the data points associated with the layer in the X and Z dimensions. FIG. 9 depicts example layers extracted from an upright person blob 902 processed from a depth image. As shown, the parabolas 903 and 905 in the head slice graph 900 and the torso slice graph 904, respectively, show significant curvature. Unlike the head slide graph 900 and the torso slice graph 904, the counter slice graph 906, which is based on a layer taken from a blob associated with a counter (not portrayed), includes a parabola 907 that is substantially flat in nature and fits closer to the line. In some implementations, the layer segmentation module 206 may use a polyfit algorithm extended to double floating-point precision to find the best line (L) and parabola (P) equations describing the data, although other suitable polynomial fitting algorithms may also be used.

The layer segmentation module 206 may then use the L and P equations associated with each layer may to determine a set of geometric properties associated with that layer. In some embodiments, the set of geometric properties may be represented as a six dimensional vector including the following elements:

1. $\Delta c$, which is the line depth at the center of the segment minus the center parabola depth as a measure of concavity $L(x_\mu)-P(x_\mu)$;
2. $RMSE_L$, which is the root mean squared error of the fitted line equation;
3. $\sigma_L$, which is the standard deviation of the fitted line equation;
4. $RMSE_P$, which is the root mean squared error of the fitted parabola equation;
5. $\sigma_P$, which is the standard deviation of the fitted parabola equation; and
6. k, which is an estimation of curvature.

The classification module 208 in some embodiments includes a layered classifier module 210 and/or a CNN module 212. The classification module 208 may uniquely identify the objects in the depth image based on the set of layers. In some embodiments, the classification module 208 may compare the layers associated with each object to a set of stored object models to determine a match. For instance, to determine a matching object model, the classification module 208 may compare the geometric properties of the layers to each of the models. As a further example, using one or more curvatures associated with one or more horizontal slices of a blob, the classification module 208 can determine which person or other object the blob corresponds to. Example types of models compiled from previous information include, but are not limited to, image galleries, Gaussian mixture models, hidden Markov models, and support vector machines.

In some embodiments, the classification module 208 may calculate, for each object model 128 stored in the storage device 197, a combined value representing the output of all the layers of the set, which represents the likelihood of the detected person belonging to that object model. The combined value may represent a recognition score used for identifying a particular individual or object.

The classification module 208 may be coupled to the layer segmentation module 206, the memory 237, the communication unit 245, and/or another component to receive the set(s) of segmented layers associated with a given depth image and the geometric properties associated with each of the layers. The classification module 208 may be coupled to the storage device 197 to retrieve the object models 128. The object models 128 may represent objects that have been trained, registered, and/or otherwise pre-determined, and are detectable and recognizable by the detection module 135. The object models may be manually input, for instance, by an applicable stakeholder such as the user, an administrator, etc., and/or may be machine learned using various machine learning technique, such as a probabilistic graphical model (e.g., a Gaussian mixture model). In some embodiments, Gaussian mixture models (GMM) with a various numbers of mixtures (e.g., 50+) can be trained using manually classified objects from various depth images.

Figure 15:
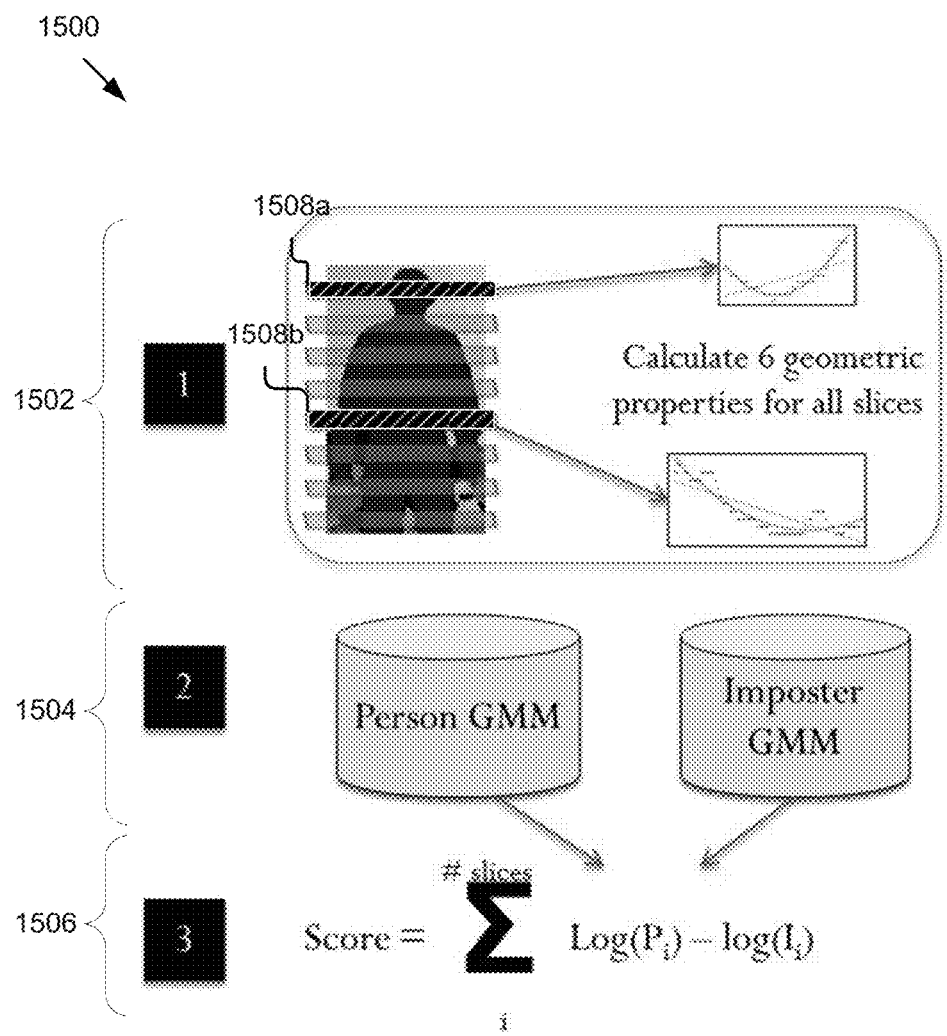
FIG. 15 is a diagram of an example method for segmenting blobs, classifying the blobs, and generating a score of the blobs.

The layered classifier module 210 may perform many of the acts or functions described above concerning the classification module 208. Specifically, the layered classifier module 210 may receive the image data, such as a depth image and a mask image, and determine the likelihoods scores for each segmented object in the image. FIG. 15 displays an example process 1500 of determining the likelihood score using the layered classifier module 210. At 1502, the image data is segmented by the layer segmentation module 206 as shown in more detail in FIG. 7. Each segment 1508 may have a plurality (e.g., six) geometric dimensional vectors calculated as described with reference to the layer segmentation module 206. At 1504, the layered classifier module 210 may use the information provided in the segments to classify each segment as a person GMM or an imposter GMM. At 1506, the layered classifier module 210 may sum the log likelihood score for persons ($P_i$) and Imposters ($I_i$) for each segment to generate a likelihood score for a portion of the depth image.

The CNN module 212 may receive image data, such as a color image and/or a depth image, from the image processor. The color image may be RGB color based, CMYK color based, or another suitable type of color processing performed by the image processor. The CNN module 212 may also receive a mask image for the layer segmentation module 206. The mask image may include different pixel groups (blobs) in the segments. The CNN module 212 may construct an image, such as a separate image or modified version of the color image, by copying the pixels from the color image, the depth image, a combination of both images, or another suitable image type (the copied pixels having locations corresponding to the pixel group areas (component areas) of the mask image).

The CNN module 212 in some embodiments uses a deep CNN network. A non-limiting example of a deep CNN network is AlexNet, which was originally developed by Krizhevesky. The CNN module 212 can uses a deep learning architecture, such as but not limited to Caffe, to train and evaluate the neural network for future processing.

In some embodiments, the CNN module 212 may have network architecture that includes convolutional layers, pooling layers, and fully connected layers. For example but not limitation, the CNN may include five convolutional layers, three pooling layers, and three fully connected layers.

In some embodiments the layers are optimizes to product a certain result. The CNN module 212 may be configured to generate the likelihood of whether an image or portion thereof (such as the constructed image discussed herein) depicts a person. As a further example, the final layer of the convolutional neural network in the CNN module 212 may comprise a certain layer type configured to generate a likelihood that an object represents a person. One non-limiting example of this is a soft max layer, which allows the AlexNet classifier to generate a likelihood that the constructed image being classified is that of a person.

The CNN module 212 may classify numerous different categories of objects in an image database. For example, in a non-limiting embodiment, AlexNet may be designed to classify one thousand different categories of objects in the ImageNet database. It should be understood that other suitable and/or compatible neural network architectures may be implemented by the CNN module 212.

The fusion module 214 may receive the likelihood score from the layered classifier module 210 and the CNN module 212 and calculates an overall likelihood score using the two different classifications. One example embodiment of the score-level fusion performed by the fusion module 214 includes a binary classifier for detecting people. The score-level fusion method converts the likelihoods to log likelihoods and uses a weighted summation to calculate an overall likelihood score, for example:

$$C_{obj} = k_l L_{obj} + K_{CNN} CNN_{obj}.$$

Summation of log-likelihoods is one possible method of combining the two scores, other variations to calculate an overall likelihood score aside from summation of log-likelihoods are also possible.

In some instances, the detection module 135 may include a registration module and/or training module (not shown) for registering and/or training new objects with the detection module 135. During registration, the registration module may capture one or more depth images of the object and the training module may generate or update an object model that describes the various properties of the object including, for instance, the curvature of the object. A user registering the object may optimize the object model by entering and/or adjusting automatically determined information (e.g., curvature information) about the object via an associated user interface, such as entering a unique name for the object (e.g., a person's name), categorizing the object, entering attributes about the object (e.g., size, weight, color, etc.). In some instances, the object models may be updated regularly with the most current, reliable models. For instance, the detection systems 103 and/or users may upload new object models to the computation server and the computation server may push the models to the various other detection systems 103 that are coupled to the network 105 for use by the detection systems 103.

In an embodiment that utilizes Gaussian mixture models to classify a given blob, the classification module 208 may determine the likelihood of a vector belonging to a predetermined Gaussian mixture person model, M, using the equation:

$$p(\vec{x}, M) = \sum_{i=1}^{50} \frac{P_i}{\sqrt{(2\pi)^6 |\sigma_i|}} e^{-(\vec{x}-\vec{\mu})^T \sigma_i^{-1}(\vec{x}-\vec{\mu})}, \text{ where}$$

$$[\sigma_i, P_i, \vec{\mu}_i] \in M_i$$

The log-likelihood of a new segment, v, belonging to a given object model, OM, may be determined by the following equation:

$$O(\vec{V}) = \log(p(\vec{V}, OM)) - \log(p(\vec{V}, \text{not\_OM})),$$

where the object model, OM, may represent one or more generic or specific people.

Given N segments in an object sequence, S, each with its own likelihood, the classification module 208 may classify the blob/object by summing up the log likelihoods and applying a predetermined threshold. A maximum cumulative score can be a reliable indicator of whether or not the set of layers/sequences correspond to a given object model or not. For instance, if the score satisfies (e.g., is greater than) a predetermined threshold that has been verified as an effective minimum likelihood that the object matches the model, then the object can be classified as corresponding to the person. This helps in the case where incorrectly classified segments might cluster together to negatively affect proper classification. For instance, a person blob may include layers associated with an arm held out parallel to the ground, a dress, and/or an object being, etc., that can cluster together negatively to bring down the likelihood score that the object is associated with a particular object model to which it in fact corresponds. In some cases, if a given blob terminates after such a negative cluster of layers, the object could potentially be incorrectly classified by the classification module 208, in which case, the classification module 208 may consider the cumulative sum of the log likelihood score.

One significant advantage of the novel layer-based approach discussed herein is that it is tolerant to occlusions. For instance, even if only a portion of the object is visible in the depth image and, as a result, some layers could not be extracted from the blob (e.g., from the top, bottom, right, left, and/or the middle of the object) and are therefore missing, the object (e.g., person) can in many cases still be recognized by the classification module 208 because the object is modeled in its corresponding object model as a collection/set of layers. For instance, for person recognition, the eyes, nose, or top of head, which are commonly required by other face and head recognition approaches to align the image with the model, do not have to be visible in the depth image for the classification module 208 to accurately recognize the person. Additional advantages of the layer-based recognition approach described herein relative to other approaches are summarized in the table 800 in FIG. 8.

Figure 3:
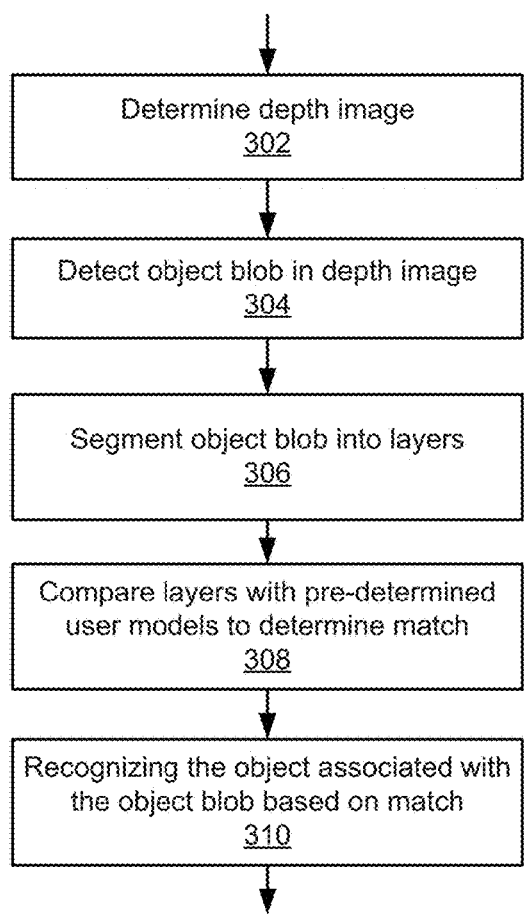
FIG. 3 is a flowchart of an example method for recognizing image objects.

FIG. 3 is a flowchart of an example method 300 for detecting and recognizing image objects. In block 302, the image processor 202 may determine a depth image. In some embodiments, the image processor 202 may determine a depth image by receiving the depth image from the sensor 155 (e.g., a stereo camera, a structured light camera, a time-of-flight camera, etc.). In block 304 the image processor 202 may detect an object blob in the depth image, in block 306 the layer segmentation module 206 may segment the object blob into a set of layers, and in block 308 the classification module 208 may compare the set of layers associated with the object blob with a set of object models to determine a match.

In some embodiments, in association with determining the set of layers, the layer segmentation module 206 may determine a curvature associated with the set of layers and the classification module 208 may evaluate the curvature using the object models when comparing the set of layers with the object models to determine the match. Further, in some embodiments, the classification module 208 may compare the set of layers with the set of object models by determining a likelihood of the object blob as belonging to each of the object models and determining the object blob to match a particular object model based on the likelihood.

Next, in block 310, the classification module 208 may recognize the object associated with the object blob based on the match. For instance, the classification module 208 may determine the identity of the object (e.g., by receiving from the storage device 197 identifying information for the object that is stored in association with the matching object model 128). In response to identifying the object, the detection module 135 may trigger the operation of a program that performs operations based on the identity of the object, such as retrieval of information associated with the object, control of one or more output devices (e.g., displays, speakers, sensors, motivators, etc.) to interact with the object (e.g., greeting a user using the user's name), pulling up account information associated with the object (e.g., a specific person/user), etc.

Figure 4A:
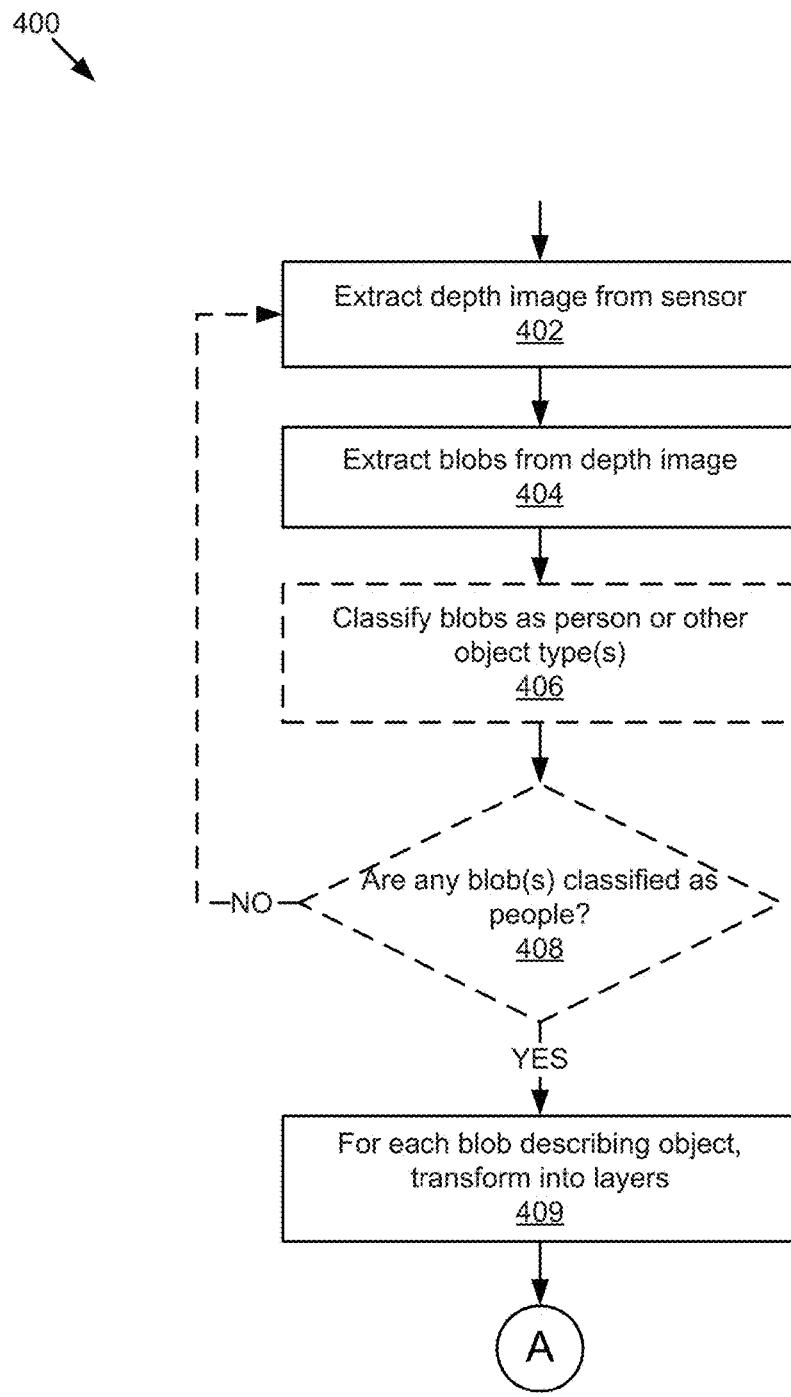
FIGS. 4A and 4B are flowcharts of a further example method for recognizing image objects.
Figure 4B:
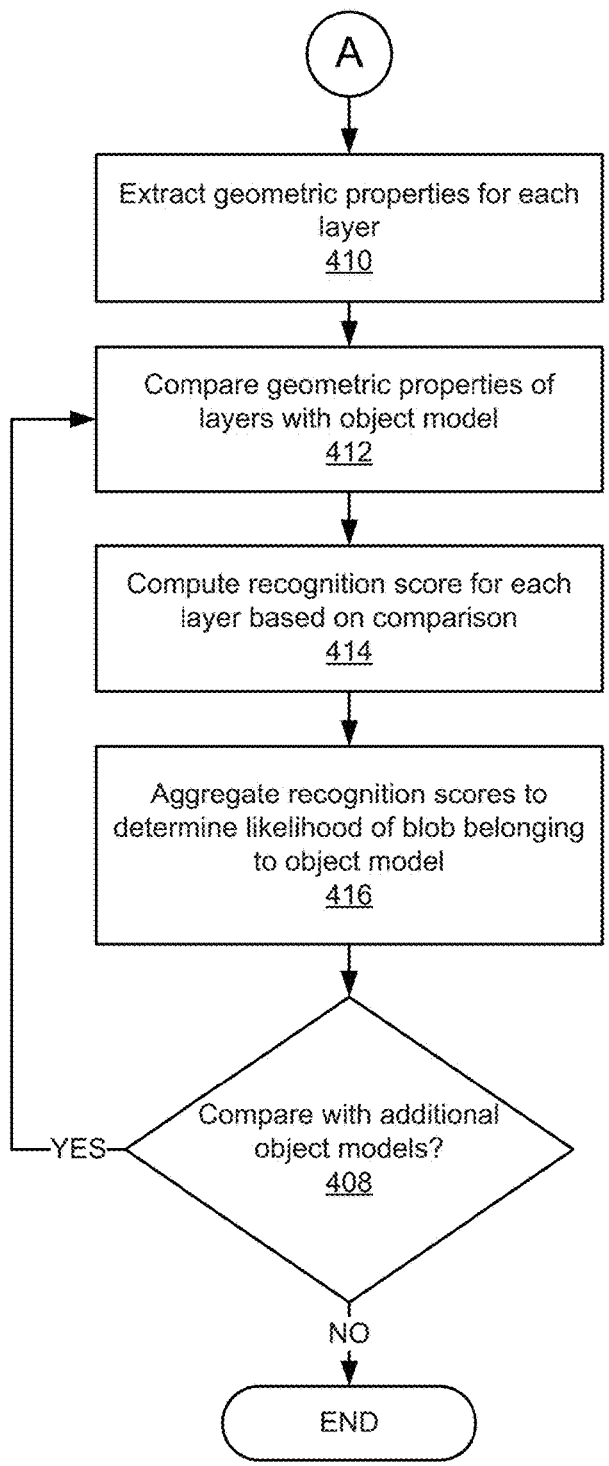

FIGS. 4A and 4B are flowcharts of a further example method 400 for detecting and recognizing image objects. In block 502, the image processor 202 extracts a depth image from the sensor 155 and then extracts one or more blobs from the depth image in block 404. In some instances, the image processor 202 may classify the extracted blobs as a human/person or other object types (e.g., animal, furniture, vehicle, etc.). For instance, the image processor 202 may detect a plurality of blobs associated with a plurality of objects depicted by the depth image, and may classify each of those blobs as a person or other type of object based on a shape of the blob as shown in block 406. In some embodiments, if a given blob is not classified into a type that meets one or more a blob type requirements, the image processor 202 may discard that blob from further processing (e.g., layer extraction, blob recognition, etc.). For instance, as shown in block 408, if none of the blobs reflect people, the method may return to the beginning and repeat until a person blob is found. In other embodiments, the method 400 may skip the classification and filtering operations in blocks 406 and 408.

Next, in block 409, for each blob provided by the image processor 202, the layer segmentation module 206 may transform the blob into a set of layers and extract one or more geometric properties for each layer of the set. Then, in block 412, the classification module 208 may compare the one or more geometric properties associated with each layer of the set of layers with one or more object models from the storage device 197. As discussed elsewhere herein the one or more geometric properties may reflect one or more of a size, curvature, curve fit, and shape fit of that layer. For instance, the one or more geometric properties include a multi-dimensional vector (e.g., 6D) containing properties associated with layer curvature, as discussed elsewhere herein.

In some embodiments, the method 400 may continue by the classification module 208 computing 414 for each object model a recognition score for each layer of the set of layers and determining a likelihood (e.g., a value) that the blob belongs to the object model by aggregating 416 (e.g., summing) the layer recognition scores. The method may proceed to compare the set of layers of each blob to find the best match as shown in block 408 and based on all of the likelihood values, the classification module 208 may recognize the blob by determining the object model the blob belongs to. For instance, the object blob may be classified as a person blob and the classification module 208 may recognize the person associated with the person blob based on the matching object model. In some cases, the object model associated with the highest likelihood may be determined as the matching object model. This determination may in some cases be dependent on the likelihood value satisfying a minimum likelihood threshold.

Figure 5:
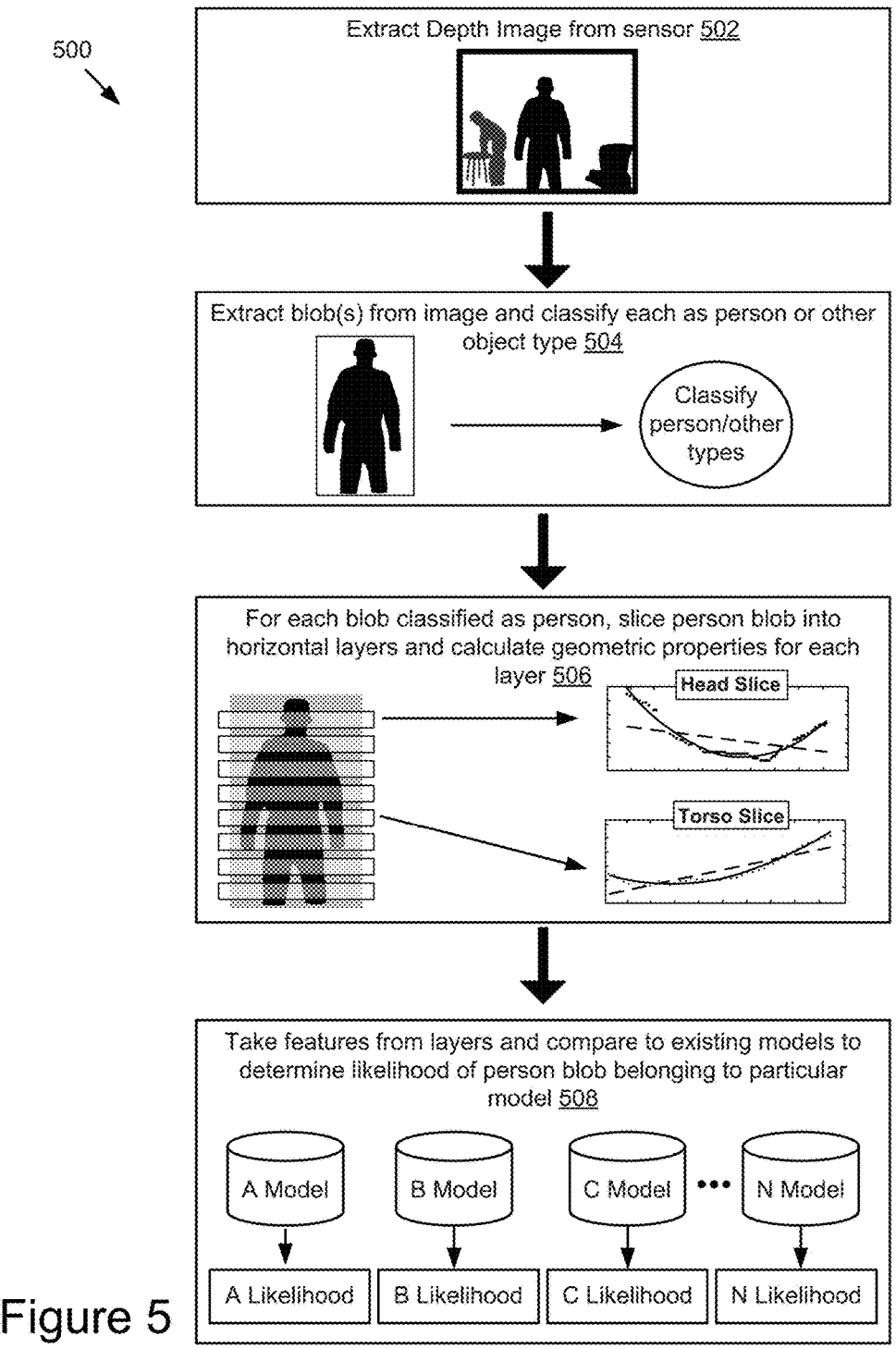
FIG. 5 is a diagram of an example method for detecting people blobs, slicing the people blobs into layers, and comparing the layers existing user models to recognize the people associated with the people blobs.

FIG. 5 is a diagram of an example method 500 for detecting people blobs, slicing the people blobs into layers, and comparing the layers existing user models to recognize the people associated with the people blobs. In essence, FIG. 5 describes the flow of information from the depth image to a recognition score. In block 502, a depth image is extracted 502 from the sensor (e.g. stereo camera, structured light camera, time-of-flight camera, etc.). In block 504, blob(s) are extracted from the image and classified as person or other type of object. In block 506, for each blob is classified as a particular object type (in this case a person), that blob is sliced into horizontal layers/slices and one or more geometric properties for each layer is computed. In block 508, for each blob, the features from select or all layers are compared to existing (trained, untrained, etc.) object models to determine if the person blob belongs to a particular model.

Figure 11:
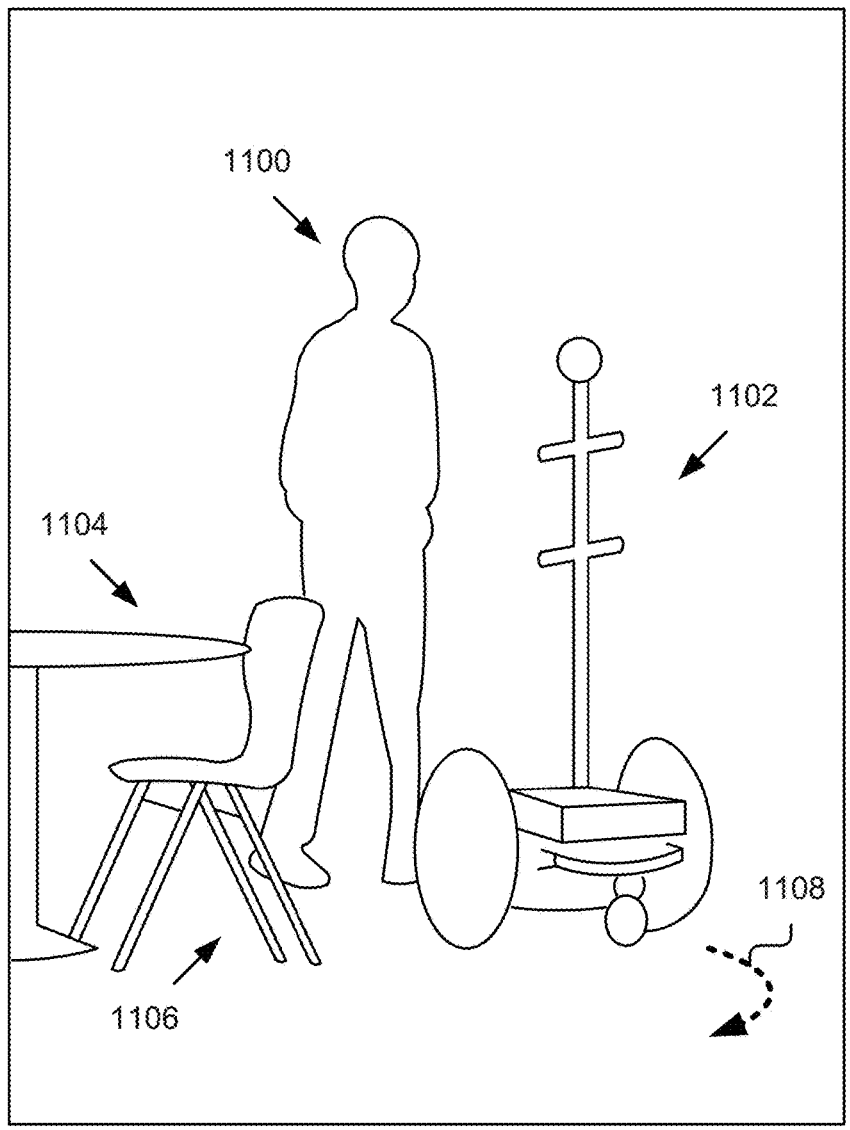
FIG. 11 illustrates an example application of the detection technology.

FIG. 11 illustrates an example application of the detection technology. As shown, the detection technology can provide a navigational aid for blind individuals. For instance, a robot equipped with the detection module 135 can help vision impaired people not only move through difficult and crowded environments, but also assist in describing the world around them. The robot companion can detect, recognize, and track their human partner as well as detect and recognize other people in the surroundings, and can do so while actively moving, navigating around obstacles, and recalculating paths to a goal. It can also work inside and outside, under all sorts of lighting conditions, and in many different ranges to the person is trying to track. FIG. 11 in particular depicts an example blind air robot 1102 leading a human partner 1100 through an indoor office environment (e.g., around detected obstacles such as a chair or a table). The robot is configured to track people and investigate the environment. For instance, the robot can detect the table and chair and inform the human partner of its existence and location should the human partner wish to sit down. In some embodiments, the robot could be configured to constantly communicate the direction of motion to the human via a physical communication medium, such as a tactile-belt around the individual's waist. The direction of motion 1108 may be computed by the robot based on the person's detected location.

By way of further illustration, in the example scenario depicted in FIG. 11, envision that the human partner 1100 began behind the detection system 103 (a robot) and followed it around a curve 1108 that passed between a large pillar (or right, not depicted) and a waist high counter top 1104. On average, the human partner 1100 maintained approximately a 1.5 m distance from the robot. At times, this distance increased to as much as 3 m when the robot had to get around the curve and out of the way. To track the person, the sensor 155 was mounted at chest level facing to the rear. This sensor recorded RGB and depth images at 30 Hz. The first 1000 images captured had the following characteristics:
  890 images containing part of a person;
  719 images with visible shoulders and/or eyes;
  171 images with only a partially visible person missing eyes and at least one shoulder (e.g. off the side of the image); and
  331 images with 2 people visible or partially visible.

Figure 12A:
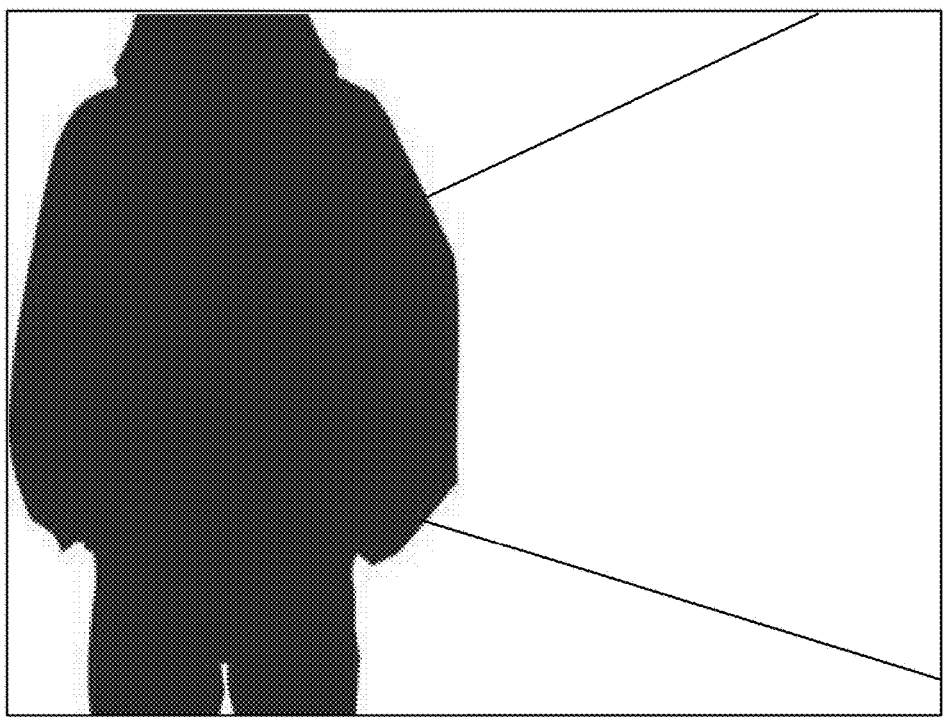
FIGS. 12A-12C depict representations of example images captured by a sensor.
Figure 12B:
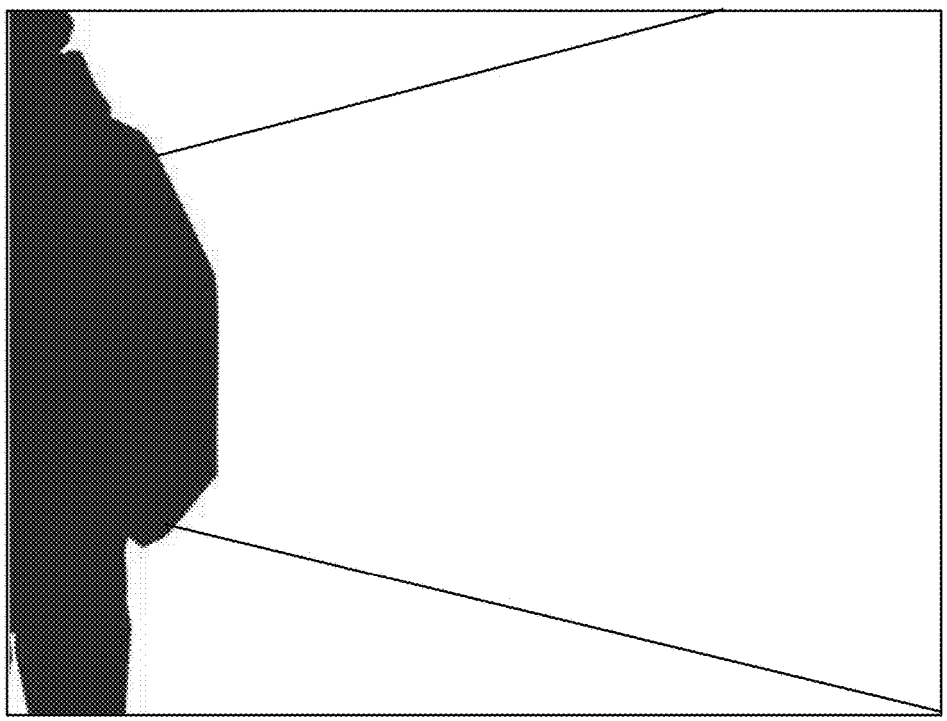
Figure 12C:
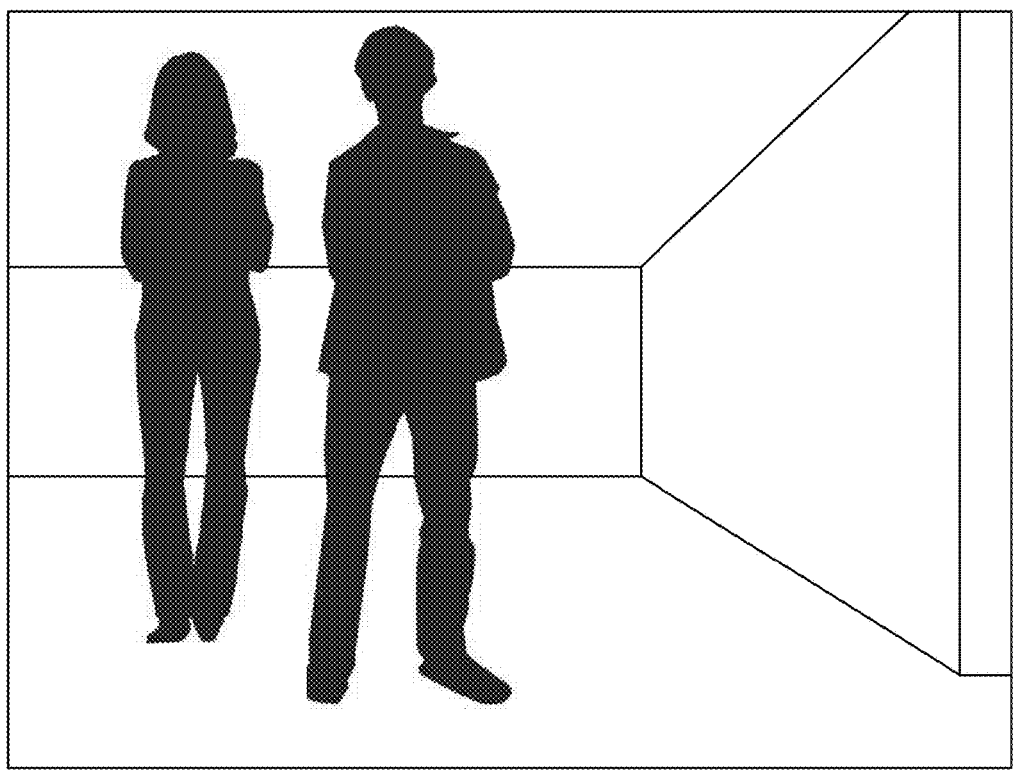

Examples of these images are depicted in FIGS. 12A, 12B, and 12C. In particular, FIG. 12A depicts a common close-range view of the human partner. The head and legs are missing because the sensor 155 was not wide enough in angle to capture everything at that close range. The image in FIG. 12B was also very common. In addition to the human partner's face being partially off screen, only one shoulder is visible as the human partner strayed to the side of the path, which is also representative of being blocked by various other vertical obstructions, like pillars, wall corners, and doors. The image in FIG. 12C depicts two people in frame.

The following table shows example statistics collected during the example robot guidance scenario.

Performance of the detection technology on the guidance scenario dataset

|  | False Positive | False Negative | False Negative (Partial Body) | Missing $2^{nd}$ Person | Speed |
|---|---|---|---|---|---|
| Polyfit, GMM | 14/1000 (0.1%) | 0/719 (0%) | 43/171 (25.1%) | 195/331 (58.9%) | >30 Hz |

In this scenario, the human partner was detected in every full frontal frame, and was missed in only 25% of the blobs with horizontal occlusions. A second person that also appeared in frame was detected 41% of the time, without a significant increase in false positive rate. The training data used for this scenario is described below.

During this scenario, another people detection algorithm was evaluated side-by-side with the detection technology on two larger data sets: 1) moving people and/or robot— evaluated with Microsoft Kinect and a stereo vision system; and 2) people at different relative rotations—evaluated in two locations: a) inside; and 2) in direct sun with the stereo vision system.

For 1), a total of 14,375 images were collected using the rear facing Kinect sensor on the robot. They were collected over 7 different runs ranging in duration from two minutes to 15 minutes. The two shortest runs involved simply moving around in front of the camera. The remaining runs involve the scenario where a person followed the robot through an environment. All but one run contained at least two people. In order to train the detection system, a human trainer manually input examples of people and other objects in the image set. Objects were tracked between successive frames by tabulating a blob similarity score to limit the required input from the trainer. 5736 positive examples, and 9197 negative examples were identified in this fashion using the Kinect dataset.

Additional data was collected using a stereo image system (Point Grey XB3) mounted in place of the Kinect. For computational efficiency, block matching with an 11×11 pixel window size was utilized to identify disparity between frames. In addition to testing the robot indoors, the robot was also taken outside in both sunlight and shady areas. A total of 7778 stereo images were collected over five trials. 5181 positive examples, and 2273 negative examples were collected in this manner. Because of the increased noise in the stereo data, fewer objects crossed an example minimum threshold of 500 pixels to be considered for people detection.

In the above scenario, the detection technology decreased the false negative rate to 0% with horizontal occlusions, without increasing the false negative rate for vertical occlusions or decreasing the speed. In more difficult, larger scenarios with more than one moving person, a performance improvement of more than 5% was achieved. This performance difference was demonstrated with various sensors both inside and outside. The addition of depth-based blob tracking across sequential frames can even further improve the percentage of time people are detected by the robot.

Figure 10A:
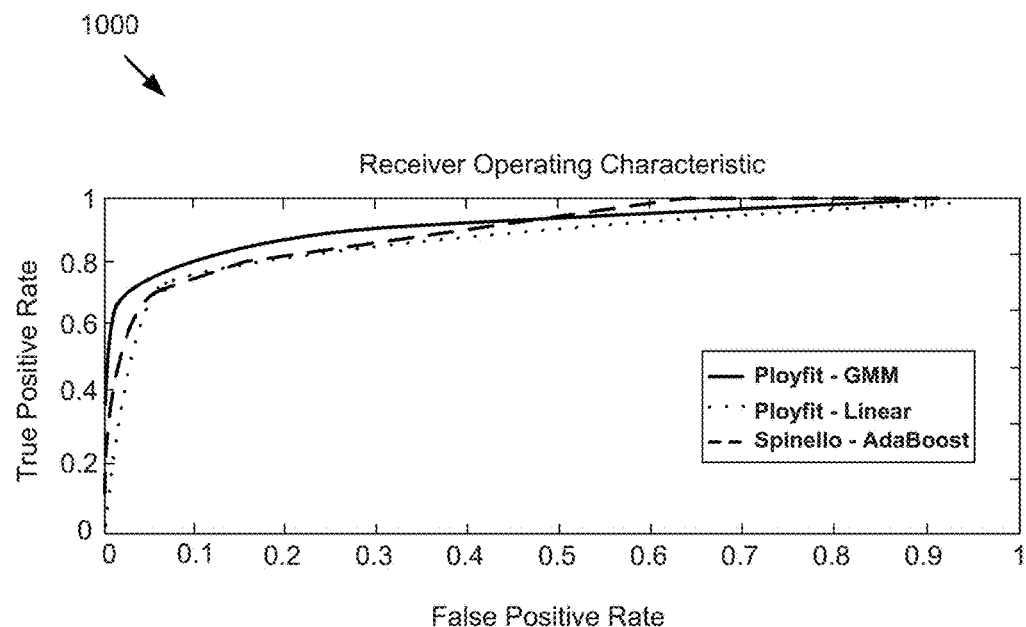
FIGS. 10A-10B are graphs showing an example comparison between two different types of sensors.
Figure 10B:
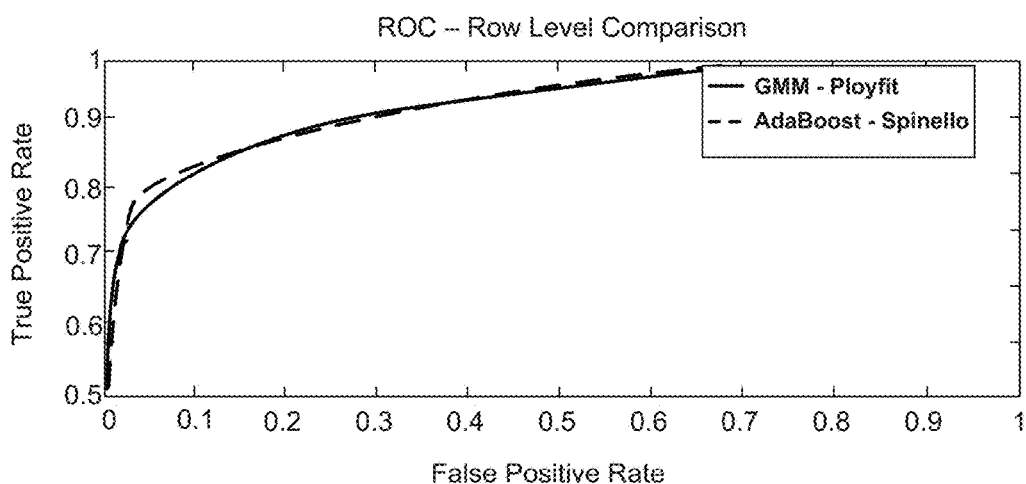

FIGS. 10A and 10B are graphs showing an example comparison between two different types of sensors. In particular, FIG. 10A illustrates the row level accuracy for people detection using Microsoft Kinect and FIG. 10B illustrates the row level accuracy for people detection using the stereo vision system. FIG. 10A includes performance estimates for three different algorithms: (1) the Spinello algorithm; (2) the set of properties with a linear classifier (Polyfit-Linear); and (3) the set of properties with a GMM (Polyfit-GMM). FIG. 10A includes performance estimates for two different algorithms: (1) the Spinello algorithm; and (3) the set of properties with a GMM (Polyfit-GMM).

With reference to FIG. 10A, when examined on a segment by segment, or row level, basis, there is little difference in ROC between the Polyfit-Linear curve and the Spinello curve. Using the novel, smaller set of geometric properties (e.g., 6D vector) is comparable without the additional computational overhead. However, with the addition of the GMM to the new features, the detection technology described herein performs significantly better and, at an estimated 3% false positive rate, provides a 3.6% improvement in the true positive rate. Over the entire ROC curve, it provides a 2.5% increase in the area.

Figure 10C:
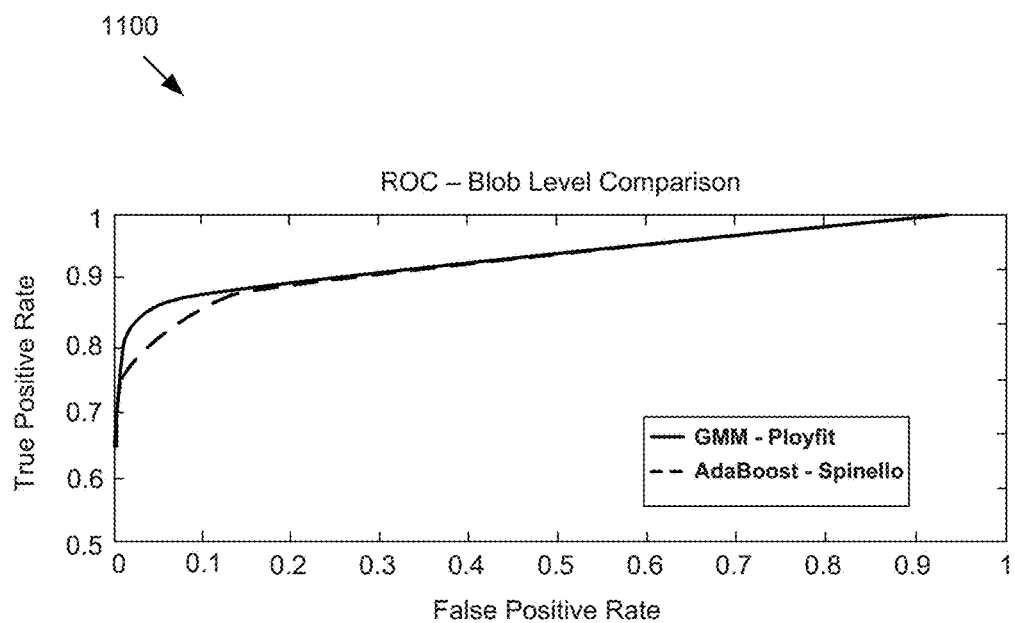
FIG. 10C is a graph showing a blob-level comparison between the novel technology described herein and another alternative.

With reference to FIG. 10B, there is less difference between feature sets, which may be due, in part, to the filtering inherent to the block matching disparity calculations, which can round edges and widen holes during blob extraction. However, FIG. 10C is a graph showing a blob-level comparison between the novel technology described herein and another alternative. In this figure, a blob-level comparison of ROC curves for Polyfit-GMM and the Spinello algorithm demonstrates more pronounced performance improvement with the stereo vision system using the detection technology described herein. In particular, the use of Polyfit-GMM with the set of geometric properties bumps up performance in the critical region from 0-10% false positive rate. At a 3% false positive rate, the new algorithm achieves 83.4% true positive rate vs. the Spinello algorithm's 77.8%.

In the above example scenario, the people objects were moving, or the robot was moving, or both moving through the environment during recognition, and as a result, a majority of the people detected were facing the camera and were generally occluded to some degree. In a second example scenario, the following set of example data demonstrates the effectiveness of people detection at different relative orientations to the camera, which is generally an important aspect of human robot interaction.

In this second scenario, a group of 29 different people stood and rotated in place in front of the sensor 155 while being captured. 20 people (15 men and 5 women) in the group were evaluated in an interior room with no windows and 24 people (17 men and 7 women) in the group were evaluated in front of floor to ceiling windows with full sun. 14 people participated in both environments. The sensor 155 used for this experiment included the stereo vision system. Detection models were trained using the data set from the guidance scenario described herein, in which a total of six people, all male, were present in training data set. The following table summarizes the results of the second scenario.

| False negative rates for interior room vs. window, for each gender. | | | |
|---|---|---|---|
| | Male | Female | Overall |
| Interior Room | 2/1893 (0.1%) | 82/533 (15.4%) | 3.5% |
| Next to Window | 107/2208 (3.8%) | 193/64 (25.3%) | 10.5% |

While there are differences between detection rates for the two types of lighting conditions, which is likely due to the effects of full sun on stereo disparity calculations, the detection technology correctly identified the male persons more than 95% of the time (e.g., 99.9% in interior room and 95.2% near window). Because there were no women in the training data, the rates for correctly identifying women were lower. However, even without training, 84.6% of the women were correctly identified in the interior room and 74.7% of the women were correctly identified when next to the window. The false negative identifications were dominated by women of slight build and/or long hair (i.e., with less curvature), which could be could be improved by broadening the training set.

Figure 13:
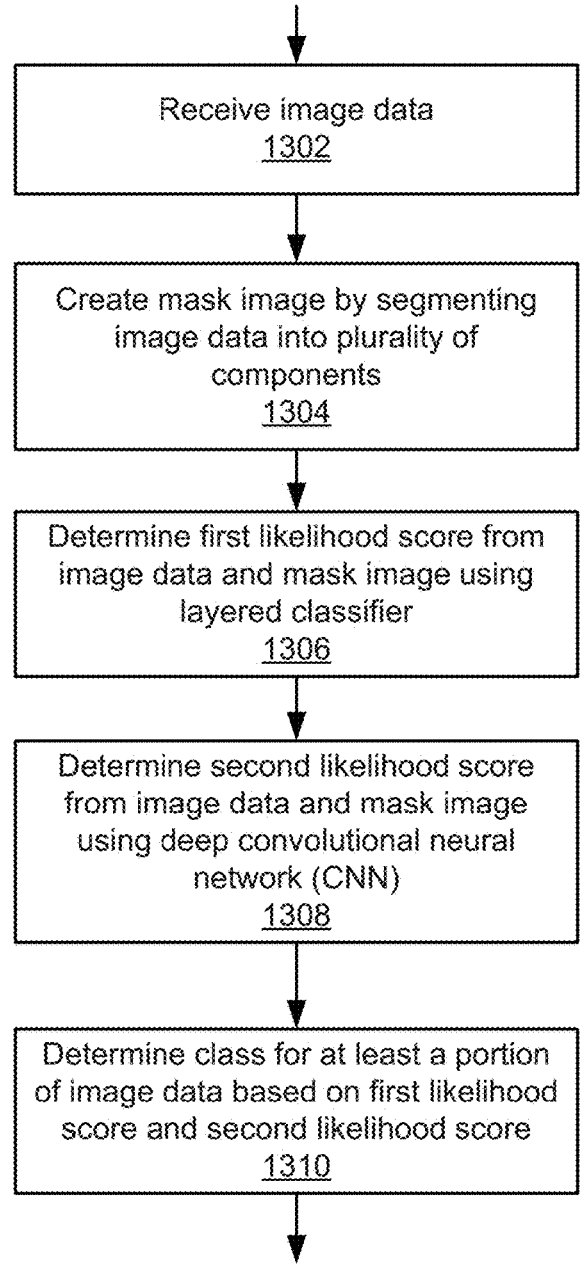
FIG. 13 is a flowchart of a further example method for recognizing image objects.

FIG. 13 is a flow chart of an example method 1300 of recognizing image objects. At 1302, the image processor 202 receives image data. The image data may various images and information be captured by sensors 155. For example, in one embodiment, a robot may be moving through an office space and a camera sensor 155 may be capturing a depth image and a color images as the robot moves through the space. At 1304, the layer segmentation module 206 creates mask images of the image data by segmenting the image data into a plurality of components as described above with reference to FIGS. 5, 7, and 15, for example.

At 1306, the layered classifier module 210 may determine a likelihood score from the image data received from the image processor 202 and the mask image data received from the layered segmentation module 206. The likelihood score calculated by the layered classifier module 210 may be based on both the depth image and the mask image. At 1308, the CNN module 212 may determine a likelihood score from the image data received from the image processor 202 and the mask image data received from the layered segmentation module 206. The likelihood score calculated by the CNN module 212 may be based on both the color image and the mask image, the depth image and the mask image, a combination of both, etc. In some embodiments, the CNN module 212 may generate an object image by copying pixels from the first image of the components in the mask image and classify the object image using the deep convolutional neural network within the CNN module 212. At 1310, the fusion module 214 may determine a class (e.g., person class or imposter class) of at least a portion of the image data received by the image processor 202, based on the likelihood score from the layered classifier module 210 and the likelihood score of the CNN module 212.

For example, using this method with reference to FIG. 6, the robot moving through the office may capture an image of a two people 606, a table 604, and a chair 608. The image data may include color data and depth data and the information may be segmented and provided to the detection module 135 for classification. By using the color data, the blobs may be grouped by the image processor 202 using different pixel colors to group different features, The dark images of the objects in the image 602 may be recognized by the image processor 202. The layer segmentation module 206 may segment the image and send the different blob segments to the classification module 208. Using both the mask image created by the layer segmentation module 206 and the depth data and color data, the image 602 can be more precisely classified using a combined score from the fusion module 214.

Figure 14A:
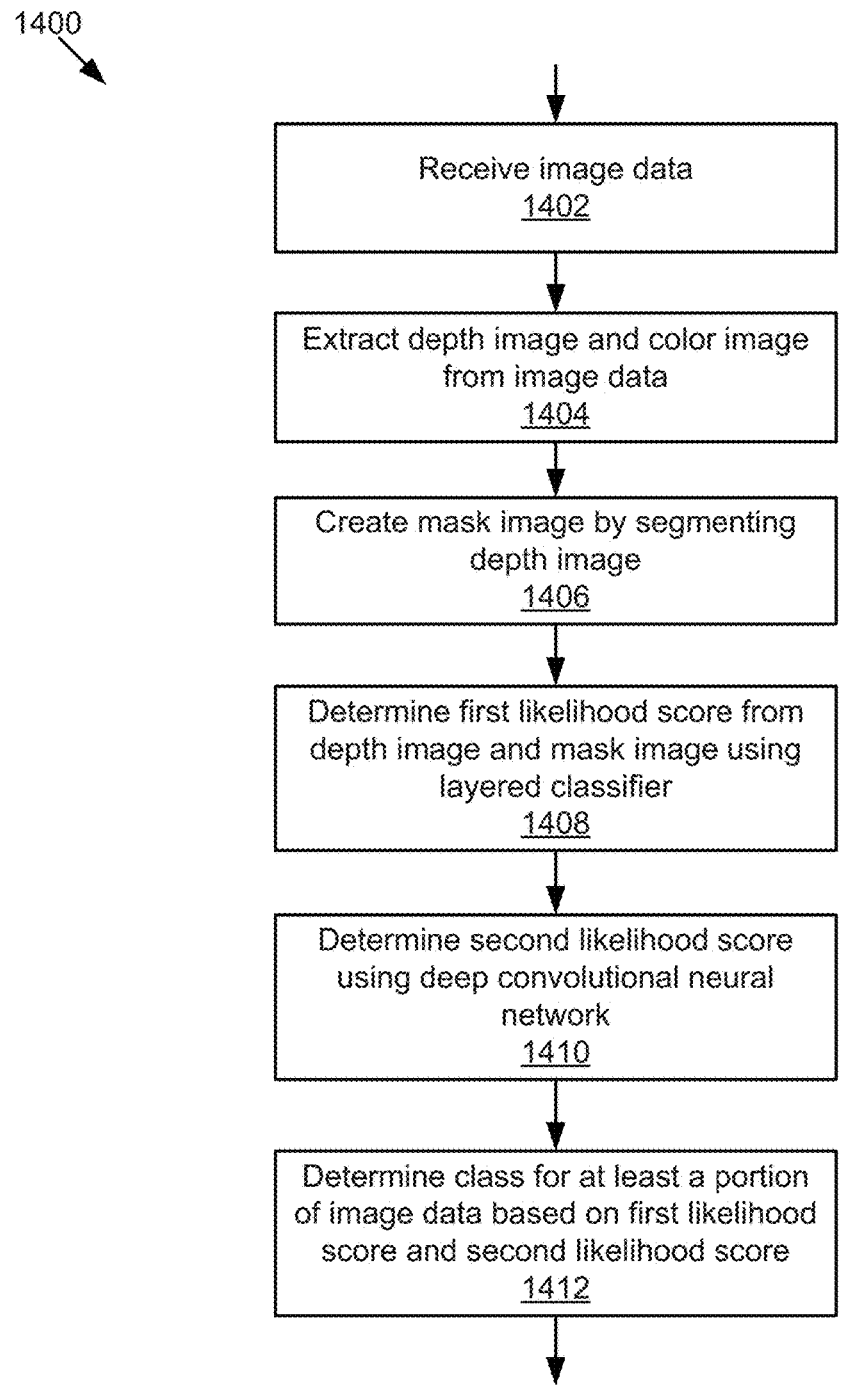
FIGS. 14A-14B are flowcharts of a further example method for recognizing image objects.

FIG. 14A is a flow chart 1400 of a further example method of recognizing image objects. At 1402, the image processor 202 receives image data. The image data may various images and information be captured by sensors 155. For example, in one embodiment, a robot may be moving through an office space and a camera sensor 155 may capture a depth image and a color images as the robot moves through the space. At 1404, the image processor 202 may extract a depth image and a color image from the image data. For example, sensor 155 may capture depth information and/or color information of the environment and the image processor 202 may extract the relevant image data captured by the sensor 155.

At 1406, the layer segmentation module 206 creates mask images of the image data by segmenting the image data into a plurality of components as described above with reference to FIGS. 5, 7, and 15. At 1408, the layered classifier module 210 may determine a likelihood score from the depth image data received from the image processor 202 and the mask image data received from the layered segmentation module 206. The likelihood score calculated by the layered classifier module 210 may be based on both the depth image and the mask image. At 1410, the CNN module 212 may determine a likelihood score from the color image received from the image processor 202 and the mask image data received from the layered segmentation module 206. The likelihood score calculated by the CNN module 212 may be based on both the color image and the mask image. In alternative embodiments, the CNN module 212 may receive a depth image and a mask image and calculate a second likelihood score using those images. At 1412, the fusion module 214 may determine a class (i.e. person class or imposter class) of at least a portion of the image data based on the likelihood score from the layered classifier module 210 and the likelihood score of the CNN module 212.

Figure 14B:
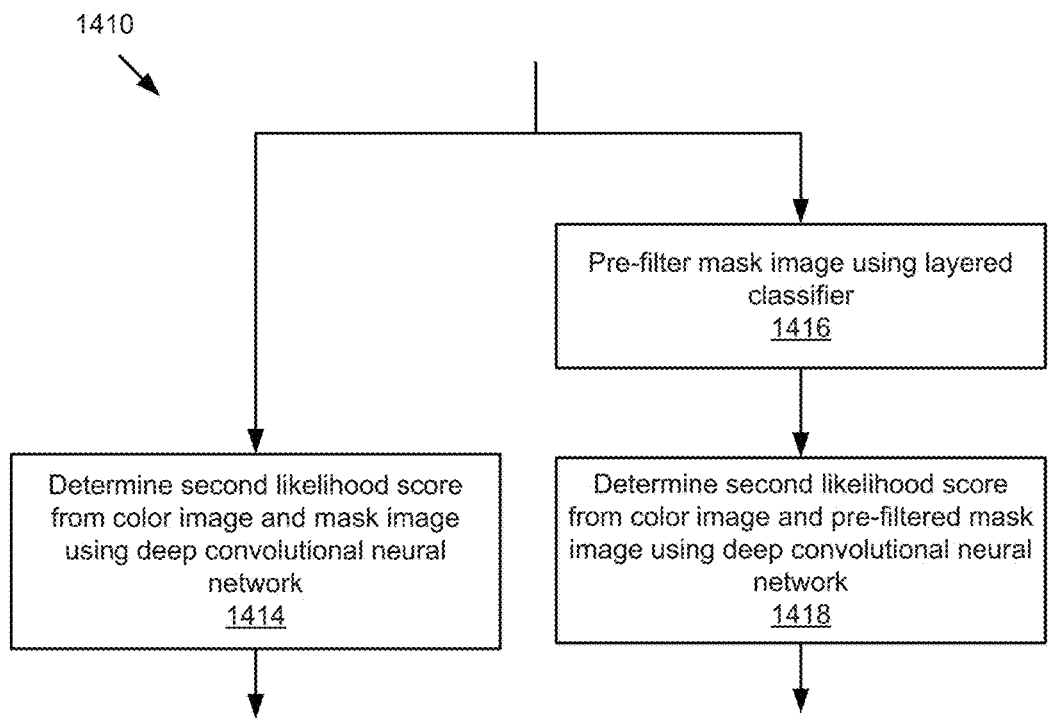

FIG. 14B is a flowchart 1410 of a further example of determining the second likelihood score. At 1416, the layered classifier module 210 receives image data including a mask image and pre-filters the mask image using the layered classifier module 210. In some embodiments, the likelihood score (i.e. classifications) from the layered classifier module 210 may be used to create the pre-filtered mask image. In some embodiments, the mask image may be generated by the layer segmentation module 206, prior to the layered classifier module 210 receiving the mask image at step 1402. At 1418, the CNN module 212 may determine a likelihood score from the color image and the pre-filtered mask image generated by the layered classifier module 210 at step 1416. In this embodiment, the layered classifier module 210 may pre-filter the mask image before sending the mask image to the CNN module 212. Pre-filtering the mask image decreases the processing time of the deep convolutional neural network as shown with reference to FIG. 19. At block 1414, the CNN module 212 receives a color image and mask image (that has not been pre-filtered) and determines a second likelihood score in parallel with the layered classifier module 210 determining a first likelihood score.

Figure 16:
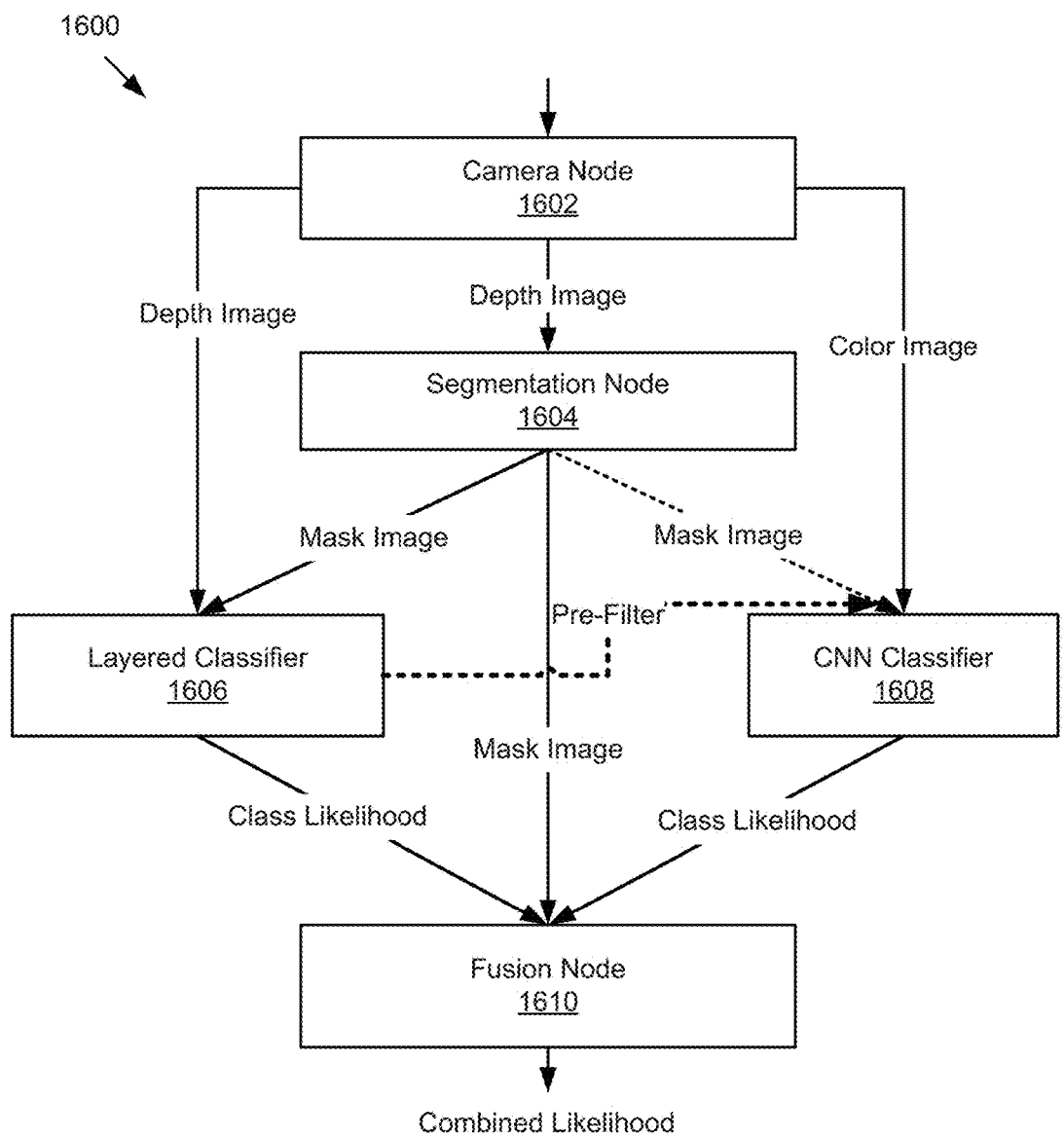
FIG. 16 is a block diagram of an example image classification system.

FIG. 16 is a block diagram of an example image classification system 1600. At 1602, a camera node receives data and extracts a depth image and a color image. The data may be captured by sensor 155 which may be part of the camera node 1602 or may be captured previously and sent to the camera node 1602. The image processor 202 of the detection module 135 may be included in the camera node 1602.

The segmentation node 1604 may include the layer segmentation module 206 and may use the layer segmentation module 206 to create a mask image out of the depth image received from the camera node 1602. The layered classifier 1606 may include the layered classifier module 210 and may use the depth image and the mask image to calculate a class likelihood that an object in the image data is a person.

In some embodiments, the layered classifier 1606 may also pre-filter the mask image from the segmentation node 1604 to decrease the processing time of the deep convolutional neural network in the CNN classifier 1608. The CNN classifier 1608 may include the CNN module 212. In some embodiments, the CNN classifier 1608 receives the mask image from the segmentation node 1605, in alternative embodiments; the CNN classifier 1608 receives the pre-filter mask image from the layered classifier 1606 to decrease processing time. The CNN classifier 1608 uses the color image and either the mask image or the pre-filtered mask image to calculate a class likelihood that an object in the image data is a person.

In further embodiments, the CNN classifier 1608 may receive a depth image or other suitable image type instead of/in addition to a color image and perform a deep convolutional network algorithm on that image data instead of/in addition to the color image, along with the mask image. The fusion node 1610 may include the fusion module 214 and may receive the class likelihood scores from the layered classifier 1606 and the CNN classifier 1608. The fusion node 1610 may combine the likelihood scores to create an overall likelihood score. In some embodiments, the fusion node 1610 may further receive the mask image from the segmentation node 1604 for further processing.

Figures 17A, 17B:
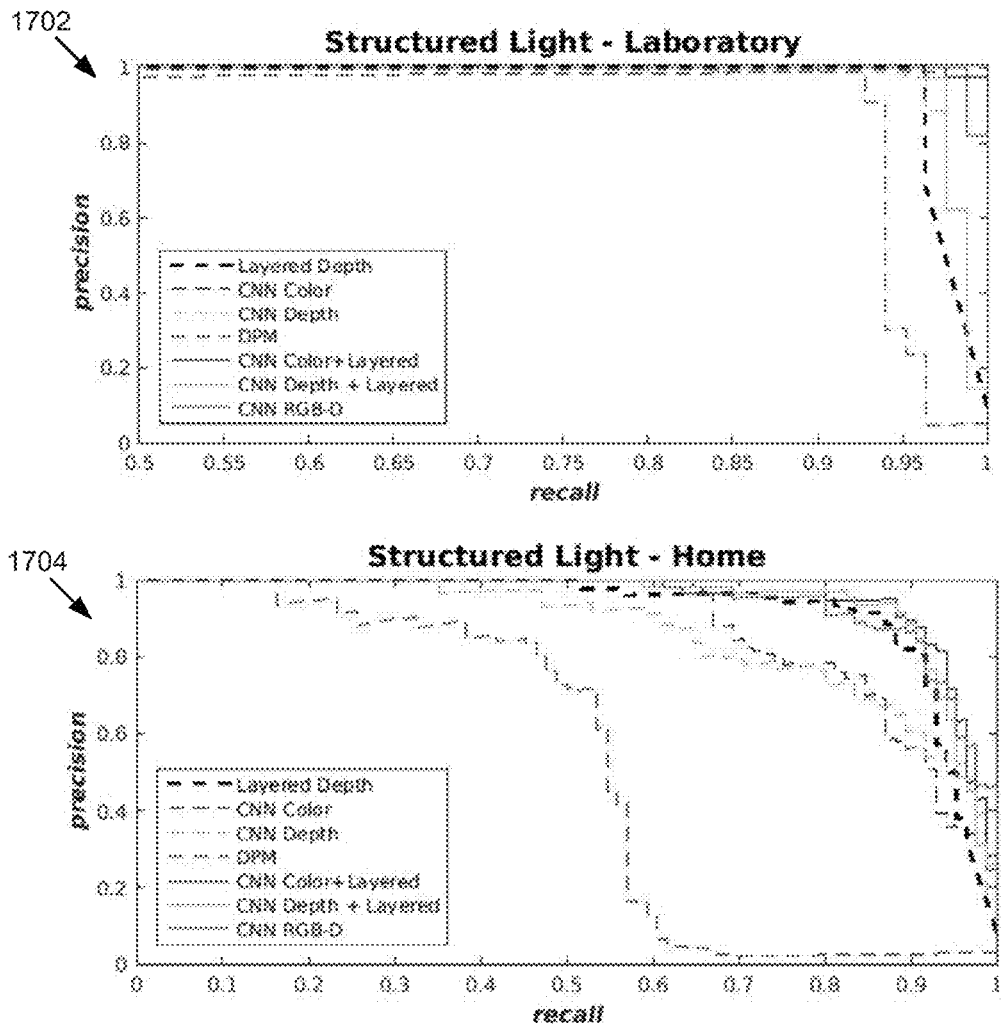
FIGS. 17A-17C are graphs and data showing evaluations using different combinations of classifiers.
Figure 17C:
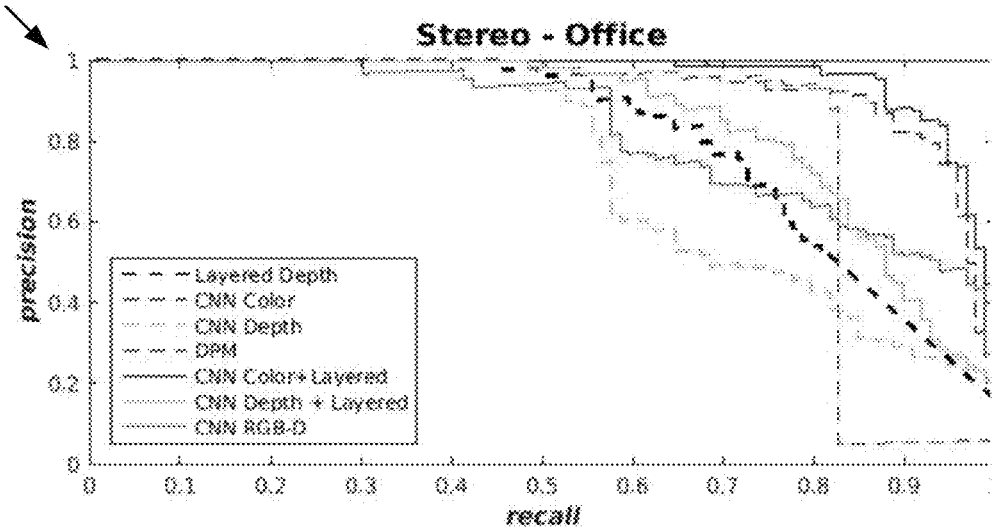
Figure 17C:
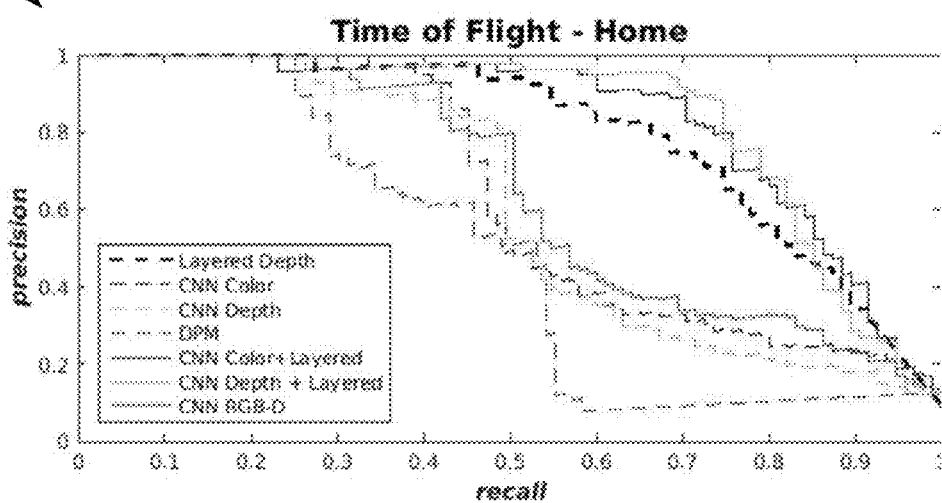

FIG. 17 displays data in the form of areas under curves for four different evaluation sets of three different sensor types in three different environments. In FIG. 17A, the graph 1702 displays the performance of seven different algorithms for image recognition, including the overall score generated by the CNN color+layered algorithm that is created using the method described in FIG. 13. As can be seen, using a structured light sensor in an open lab space, the Layered+CNN-RGB has the highest combined score for object recognition compared to the six other common recognition algorithms. In the graph 1704, the seven algorithms were tested using a structured light sensor in a home environment. In this test, the Layered+CNN-RGB has the highest score. The layered score combined with a combination neural network score based on the depth image also performed generally better relative to other methods in these tests.

In FIG. 17B, table 1706 displays data from the test of the seven algorithms using the four different sensors. In the four different tests, the fusion scores for object recognition of the algorithms that used both a layered classifier and a CNN classifier performed better than the other algorithms that did not include a combined overall score. In the structured light sensors tests and the stereo sensor test the layered classifier combined with the CNN classifier of the color image (RGB) had the highest object recognition scores. In the time of flight camera sensor test, the layered classifier combined with the CNN classifier of the depth image had the highest object recognition score.

In FIG. 17C, the graph 1706, displays test data of the seven different algorithms using a stereo camera sensor in an office environment. The Layered+CNN RGB algorithm has the best performance in this test environment as well. In graph 1708, the seven different algorithms were tested using a time-of-flight camera in a home environment. In this test, the fusion of the layered classifier and CNN classifier outperformed the other algorithms.

Figure 18:
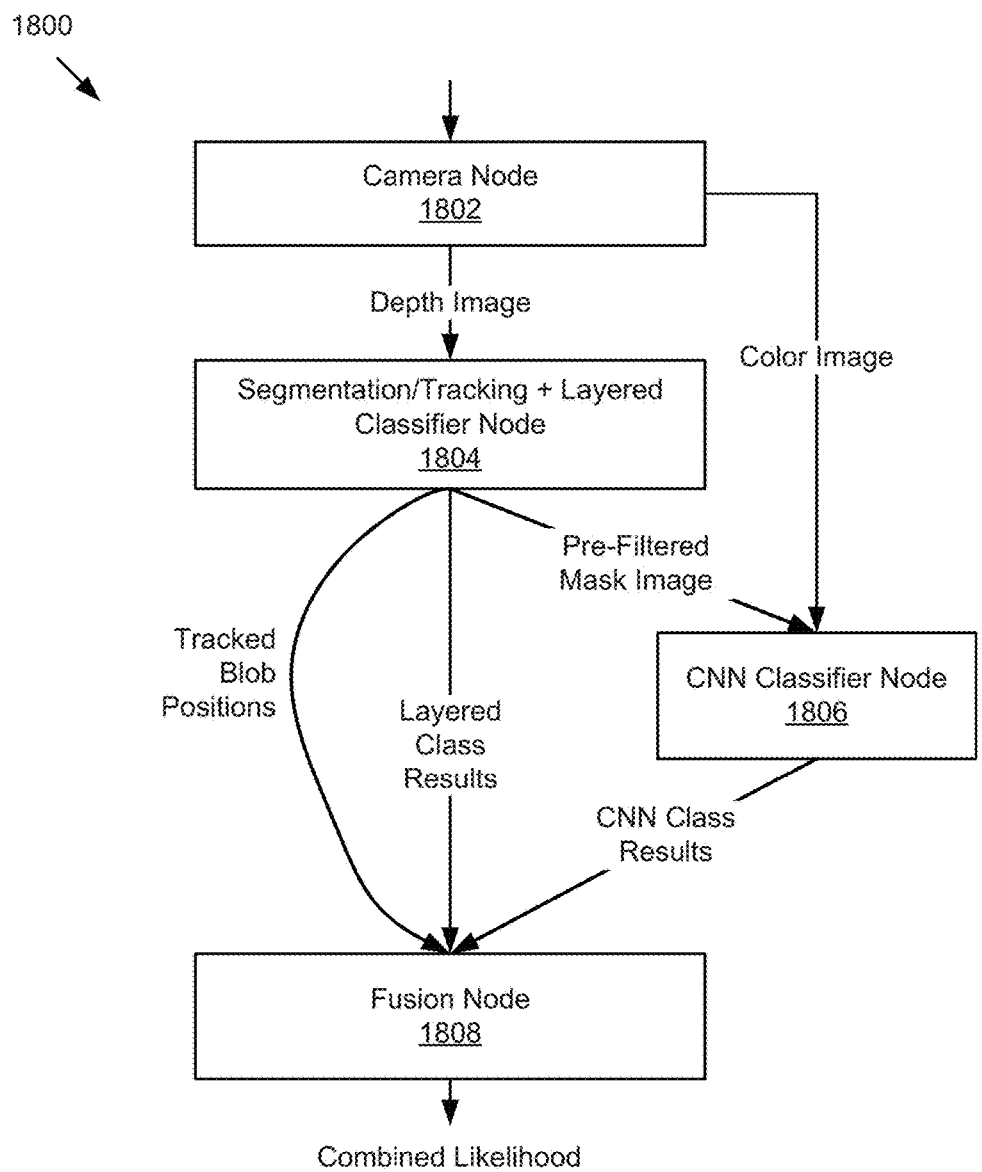
FIG. 18 is a block diagram of an example image classification system using a pre-filter layered classifier.

FIG. 18 is a block diagram 1800 of an image classification device using pre-filter layered classifiers. The camera node 1802 may include sensor 155 for capturing data. The camera node 1802 may also include the image processor 202 for processing image data either captured or received. The image processor 202 may process the image data to extract a depth image and/or a color image. The depth image may be sent to the segmentation/tracking+layered classifier node 1804.

The segmentation/tracking+layered classifier node 1804 may include the layer segmentation module 206 and/or the layered classifier module 210. The segmentation/tracking+layered classifier node 1804 segments the depth image and classifies the objects into a layered class result that may be sent to the fusion node. The segmentation/tracking+layered classifier node 1804 also generates an image mask that is then pre-filtered and sent to the CNN classifier node 1806 for classification using the deep convolutional neural network.

The segmentation/tracking+layered classifier node 1804 also may track blob positions in the different sections and provide the blob position information to the fusion node

1808. The CNN classifier node 1806 may receive the pre-filter mask image and the color image for use in classifying an object in the image data. In some embodiments, the CNN classifier node 1806 may alternatively receive a depth image from the camera node 1802 and use the depth image and the pre-filtered mask image to classify and object in the image data. The fusion node 1808 receives the CNN class results and the layered class results and calculates an overall combined likelihood that an object in the image data is a person. In some embodiments, the fusion node 1808 may also receive the tracked blob positions for further processing or for inclusion in the calculation of the combined likelihood score.

Figure 19:
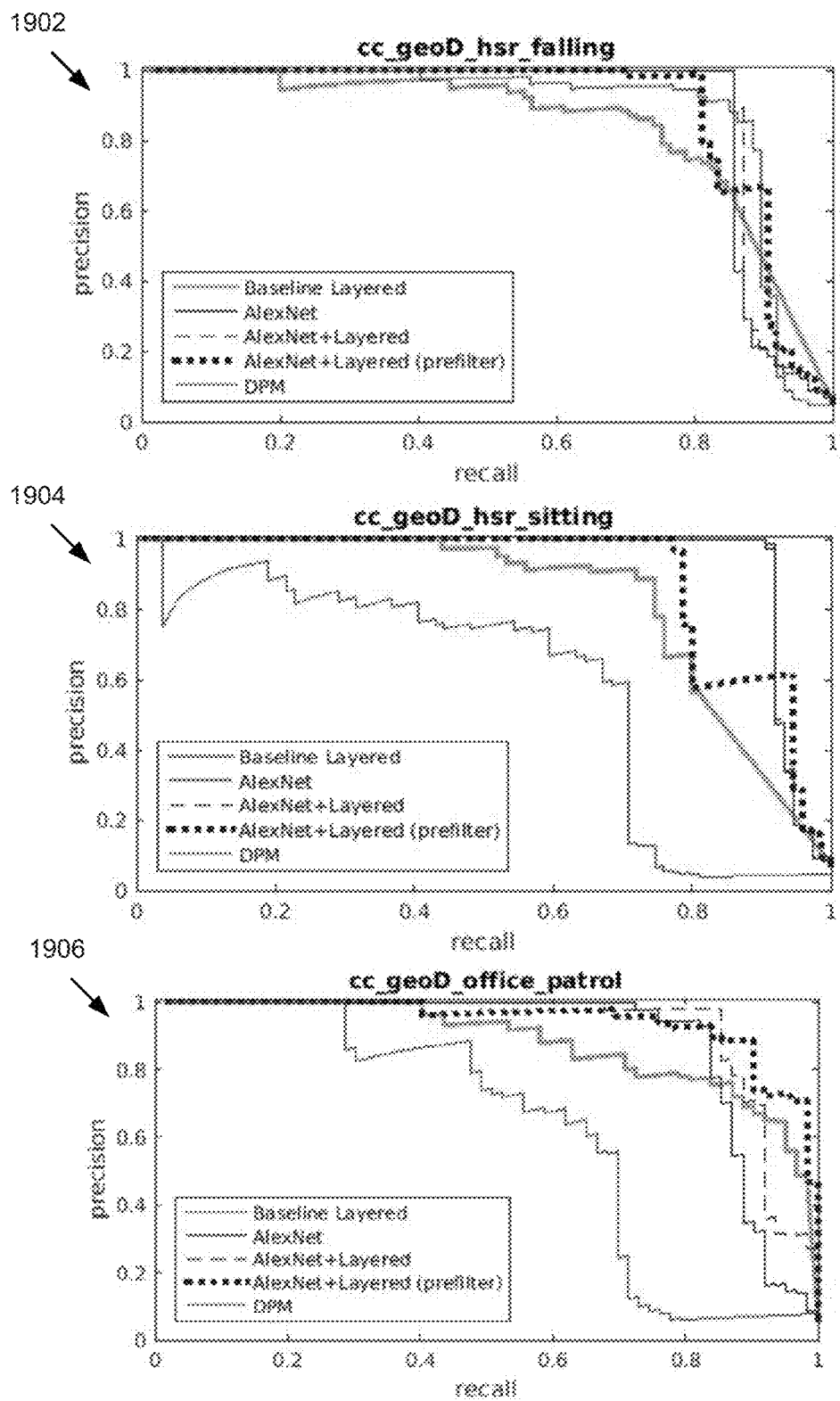
FIG. 19 is graph data showing evaluations using the pre-filter layered classifier.

FIG. 19 displays data in the form of graphs of precision data vs. recall curves of three different situations. The algorithms used include a pre-filtered CNN (alexnet)+layered classifier, a CNN+layered classifier without the pre-filter, and various CNN and layered classifier without the fusion of the two combined classifiers. In graph 1902, the test was of a person falling and the precision of the recognition versus the recall time to classify the object as a person. In this system, the pre-filtered algorithm was somewhere in the middle, while the time was significantly greater than the layered system without the pre-filter. In graph 1904, the test was of a person sitting on a bed. The pre-filtered algorithm may in some cases sacrifice precision for improved computational speed compared to the fused system. In graph 1906, the test was done on a robot moving around the office, in this test, the pre-filtered algorithm shows a higher precision and a higher recall speed on the curve then the other algorithms.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method for performing object recognition comprising:
   receiving image data;
   extracting a depth image and a color image from the image data;
   creating a mask image by segmenting the image data into a plurality of components;
   identifying objects within the plurality of components of the mask image;
   determining a first likelihood score from the depth image and the mask image using a layered classifier;
   determining a second likelihood score from the color image and the mask image by generating an object image by copying pixels from a first image of the components in the mask image and classifying the object image using a deep convolutional neural network (CNN); and
   determining a class for at least a portion of the image data based on the first likelihood score and the second likelihood score.

2. A computer-implemented method for performing object recognition comprising:
   receiving image data;
   creating a mask image by segmenting the image data into a plurality of components;
   determining a first likelihood score from the image data and the mask image using a layered classifier;
   determining a second likelihood score from the image data and the mask image using a deep convolutional neural network (CNN); and
   determining a class for at least a portion of the image data based on the first likelihood score and the second likelihood score.

3. The computer-implemented method of claim 2, wherein the determining the second likelihood score from the image data and the mask image using the deep CNN includes:
   extracting a first image from the image data;
   generating an object image by copying pixels from the first image of the components in the mask image;
   classifying the object image using the deep CNN;
   generating classification likelihood scores indicating probabilities of the object image belonging to different classes of the deep CNN; and
   generating the second likelihood score based on the classification likelihood scores.

4. The computer-implemented method of claim 3, wherein the first image is one of a color image, a depth image, and a combination of a color image and a depth image.

5. The computer-implemented method of claim 2, wherein determining the class of at least the portion of the image data includes:
   fusing the first likelihood score and the second likelihood score into an overall likelihood score; and
   responsive to satisfying a predetermined threshold with the overall likelihood score,
   classifying the at least the portion of the image data as representing a person using the overall likelihood score.

6. The computer-implemented method of claim 2, further comprising:
   extracting a depth image and a color image from the image data, wherein determining the first likelihood score from the image data and the mask image using the layered classifier includes determining the first likelihood score from the depth image and the mask image using the layered classifier, and determining the second likelihood score from the image data and the mask image using the deep CNN includes determining the second likelihood score from the color image and the mask image using the deep CNN.

7. The computer-implemented method of claim 2, wherein the deep CNN has a soft max layer as a final layer to generate the second likelihood score that the at least the portion of the image data represents a person.

8. The computer-implemented method of claim 2, further comprising:
   converting the first likelihood score and the second likelihood score into a first log likelihood value and a second log likelihood value; and
   calculating a combined likelihood score by using a weighted summation of the first log likelihood value and the second log likelihood value.

9. The computer-implemented method of claim 2, wherein the class is a person.

10. The computer-implemented method of claim 2, wherein determining the second likelihood score further comprises:
    determining the second likelihood score using the image data and the first likelihood score from the layered classifier.

11. A system for performing object recognition comprising:
a processor; and
a memory storing instructions that, when executed, cause the system to:
create a mask image by segmenting image data into a plurality of components;
determine a first likelihood score from the image data and the mask image using a layered classifier;
determine a second likelihood score from the image data and the mask image using a deep convolutional neural network (CNN); and
determine a class for at least a portion of the image data based on the first likelihood score and the second likelihood score.

12. The system of claim 11, wherein the instructions that cause the system to determine the second likelihood score from the image data and the mask image using the deep CNN further cause the system to:
extract a first image from the image data;
generate an object image by copying pixels from the first image of the components in the mask image;
classify the object image using the deep CNN;
generate classification likelihood scores indicating probabilities of the object image belonging to different classes of the deep CNN; and
generate the second likelihood score based on the classification likelihood scores.

13. The system of claim 12, wherein the first image is one of a color image, a depth image, and a combination of a color image and a depth image.

14. The system claim 11, wherein the instructions that cause the system to determine the class of at least the portion of the image data further cause the system to:
fuse the first likelihood score and the second likelihood score into an overall likelihood score; and
responsive to satisfying a predetermined threshold with the overall likelihood score,
classify the at least the portion of the image data as representing a person using the overall likelihood score.

15. The system of claim 11, wherein the memory stores further instructions that cause the system to:
extract a depth image and a color image from the image data, wherein determining the first likelihood score from the image data and the mask image using the layered classifier includes determining the first likelihood score from the depth image and the mask image using the layered classifier, and determining the second likelihood score from the image data and the mask image using the deep CNN includes determining the second likelihood score from the color image and the mask image using the deep CNN.

16. The system of claim 11 wherein the deep CNN has a soft max layer as a final layer to generate the second likelihood score that the at least the portion of the image data represents a person.

17. The system of claim 11, wherein the memory stores further instructions that cause the system to:
convert the first likelihood score and the second likelihood score into a first log likelihood value and a second log likelihood value; and
calculate a combined likelihood score by using a weighted summation of the first log likelihood value and the second log likelihood value.

18. The system of claim 11, wherein the class is a person.

19. The system of claim 11, wherein the instructions that cause the system to determine the second likelihood score further cause the system to:
pre-filter the mask image using the layered classifier; and
determine the second likelihood score using the image data and the pre-filtered mask image.

20. The system of claim 11, wherein the layered classifier determines the first likelihood score using a Gaussian mixture.

* * * * *